(12) United States Patent
Poinsatte et al.

(10) Patent No.: US 12,091,515 B2
(45) Date of Patent: Sep. 17, 2024

(54) METHOD OF RECYCLING HIGH RELATIVE VISCOSITY NYLON

(71) Applicant: INV NYLON POLYMERS AMERICAS, LLC, Wilmington, DE (US)

(72) Inventors: John P. Poinsatte, Wilmington, DE (US); Joshua J. Wahrmund, Chattanooga, TN (US)

(73) Assignee: INV NYLON POLYMERS AMERICAS, LLC, Wilmington, DE (US)

( * ) Notice: Subject to any disclaimer, the term of this patent is extended or adjusted under 35 U.S.C. 154(b) by 752 days.

(21) Appl. No.: 17/269,105

(22) PCT Filed: Aug. 20, 2019

(86) PCT No.: PCT/US2019/047188
§ 371 (c)(1),
(2) Date: Feb. 17, 2021

(87) PCT Pub. No.: WO2020/041259
PCT Pub. Date: Feb. 27, 2020

(65) Prior Publication Data
US 2021/0309826 A1    Oct. 7, 2021

Related U.S. Application Data

(60) Provisional application No. 62/765,292, filed on Aug. 20, 2018.

(51) Int. Cl.
*C08J 11/26* (2006.01)
*C08G 69/48* (2006.01)
*D01F 13/04* (2006.01)

(52) U.S. Cl.
CPC .............. *C08J 11/26* (2013.01); *C08G 69/48* (2013.01); *D01F 13/04* (2013.01); *C08J 2377/06* (2013.01)

(58) Field of Classification Search
CPC .. C08J 11/26; C08J 2377/00–12; C08G 69/48
See application file for complete search history.

(56) References Cited

U.S. PATENT DOCUMENTS

| | | | |
|---|---|---|---|
| 7,319,113 B2 | 1/2008 | Mckinnon | |
| 8,366,977 B2 | 2/2013 | Weiser et al. | |
| 2004/0249001 A1 | 12/2004 | Leboeuf | |
| 2005/0182229 A1 | 8/2005 | Ibar | |
| 2013/0255539 A1 | 10/2013 | Brdarski et al. | |
| 2019/0248965 A1* | 8/2019 | Bergmann | C08L 77/10 |

FOREIGN PATENT DOCUMENTS

| | | | | |
|---|---|---|---|---|
| CN | 104725646 A | | 6/2015 | |
| GB | 921667 A | * | 3/1963 | |
| JP | 10489864 A | | 3/1992 | |
| JP | 2002241609 A | | 8/2002 | |
| JP | 2008531827 A | | 8/2008 | |
| JP | 2009120773 A | | 6/2009 | |
| JP | 2014091771 A | | 5/2014 | |
| JP | 2020501001 A | | 1/2020 | |
| KR | 20020025779 A | | 4/2002 | |
| KR | 20040034365 A | | 4/2004 | |
| KR | 20120056254 A | | 6/2012 | |
| WO | 9305097 A1 | | 3/1993 | |
| WO | WO-0121712 A1 | * | 3/2001 | ............. C08G 69/48 |
| WO | WO-2018072875 A1 | * | 4/2018 | ......... B29C 45/0001 |

OTHER PUBLICATIONS

Machine Translation of CN104725646A. Jun. 24, 2015. (Year: 2015).*
Machine Translation of JPH04-89864A. Mar. 24, 1992. (Year: 1992).*
International Search Report and Written Opinion for PCT Application No. PCT/US2019/047188, mailed on Dec. 18, 2019, 8 pages.
International Preliminary Report on Patentability for PCT Application No. PCT/US2019/047188, issued on Feb. 23, 2021, 6 pages.
Notification of Reasons for Refusal received for JP application No. 2021-509923, mailed on Apr. 26, 2022, 12 pages. (6 pages of English translation and 6 pages of official copy).

* cited by examiner

*Primary Examiner* — Stephen E Rieth

(57) ABSTRACT

The disclosed method relates to a method of recycling high relative viscosity nylon. The process involves melting a base polyamide with a dry blended mixture of dicarboxylic acid and a second polyamide. The disclosed method provides a process of controlling the relative viscosity of the combined polyamides and, in various aspects, the second polyamide may be nylon plop or other polyamide having high relative viscosity.

23 Claims, 9 Drawing Sheets

METHOD OF RECYCLING HIGH RELATIVE VISCOSITY NYLON

FIELD

This disclosure relates to a method for recycling or processing a polyamide (e.g., nylon) feed containing high relative viscosity polyamide to produce product having lower relative viscosity. The method involves use of an organic dicarboxylic acid additive.

BACKGROUND

Nylon is a family of synthetic polyamide polymers having applications in a variety of industries, including textiles, automotive, machine parts, packaging and consumer goods. Nylon is readily processed into fibers, pellets, molded shapes and films which have exceptional strength and compatibility across a range of temperatures and environments. The most common nylons are nylon-6 (poly-caprolactamide) and nylon-6,6 (poly-hexamethylenedianine adipanide).

Recent efforts have sought to optimize nylon production in an environmentally-responsible manner by improved yields and using renewable or recycled sources of feedstock. (U.S. Pat. Nos. 7,319,113; 8,366,977; US 2004/02490001) However, such efforts have not sufficiently addressed the problem of low-quality polyamide by-products produced during nylon production processes and downstream use. Although it would be desirable to recycle or reuse such waste products as feedstock, existing processes do not provide an efficient, green and cost-effective solution.

One by-product of polyamide production and processing is high relative viscosity (RV) polyamide. High RV polyamide is not commercially valuable and must be disposed or reprocessed into commercially acceptable polyamide at expense. One example of a type of high RV polyamide is known as "plop". Plop can arise, for example, when a processed polyamide is discarded as a large mass which insufficiently cools and continues to polymerize internally to a detriment of causing increased relative viscosity. Reprocessing high RV polyamide is challenging and typically results in a product which also has excessively high RV. Simply re-melting the material does not sufficiently reduce RV to commercially acceptable levels.

One approach to recycling by-product or waste polyamide is by mixing it with a portion of low RV or on-specification polyamides and re-melting. However, a major limitation of this approach is that the relative viscosity (RV) of the resulting product is limited by the RV of the initial materials and the amount of low RV material used. Use of high RV material as feedstock will tend to drive up the RV of resulting product. Since each product has an upper-bound specification limit for RV, it follows that there is an upper limit to the percentage of high RV polyamide that can be used in any re-melting process. Use of high RV materials can thus cause the products to run off-specification and can result in lower value product. Without another way to readily control RV, such an approach thus requires undesirable constraints such as processing only a minimal amount of high RV polyamide at a time while consuming large amounts of more valuable polyamides.

Other approaches to recycling nylon waste rely on depolymerizing the polyamide to regenerate starting materials which are isolated and then reprocessed through a polymerization and extrusion system. (U.S. Pat. No. 7,319,113 B2) Such an approach is costly, involved, and provides little if any economic benefit. Other approaches involve treating by-product or waste polyamides with solvent, water or other fluids. (US 2005/0182229 A1, WO 1993/005097 A1; CN104725646 A) Such approaches are problematic because they complicate handling and maintenance. Such liquids must be accounted for during and after processing, ultimately generating additional waste. Yet other approaches involve use of a multicomponent system of reactive monomers. (US 2013/0255539 A1) However, such monomers generate new products in situ resulting in structures substantially differing from that of the initial high RV polyamide. Such additives thus result in a product with a chemical makeup deviating from the original product specification.

Present approaches to recycling by-product or waste polyamide are each associated with drawbacks which can outweigh the benefits of recycling. Certain waste and by-product polyamides are particularly intractable, such as plop and other high RV polyamides, which are undesired in downstream and commercial applications and yet also suffer from poor options for recycling and reprocessing. There is a need for a simple, efficient, economic and environmental method for recycling or processing by-product and waste polyamide.

SUMMARY

The disclosed method provides a method of reducing the relative viscosity (RV) of a polyamide, comprising:
  treating a polyamide having a RV of 45 or greater with an additive comprising an organic dicarboxylic acid dry-blended with a second polyamide, wherein greater than 50 wt % of the additive is the second polyamide; and
  melting the treated polyamide.

The disclosed method also provides a method of reducing the relative viscosity (RV) of recycled plop, comprising:
  granulating nylon plop;
  treating the granulated plop with an organic dicarboxylic acid in an amount that is 0.01 wt % to 1.0 wt % of the treated plop; and
  melting the treated plop.

Further disclosed is a method of reducing the relative viscosity (RV) of a polyamide, comprising:
  treating a polyamide having a RV of 45 or greater with an additive comprising an organic dicarboxylic acid, having a particle size distribution with >94% by weight of the particles scaling <710 microns, dry-blended with a second polyamide, with a particle size distribution such that >97 wt % of particles >300 microns and ≤3 wt % of particles ≤300 microns, wherein greater than 50 wt % of the additive is the second polyamide; and
  melting the treated polyamide.

Further disclosed is a method of controlling the relative viscosity (RV) of a first polyamide when the first polyamide is melted, the method comprising:
  treating the first polyamide having a RV of 45 or greater with an additive mixture comprising an organic dicarboxylic acid and a second polyamide, wherein the particle size distribution of the organic dicarboxylic acid component is characterized by >94% by weight of the particles scaling <710 microns, dry-blended with a second polyamide, where the second polyamide is characterized by >97 wt % of particles scaling >300 microns and ≤3 wt % of particles scaling ≤300 microns, and wherein greater than 50 wt % of the additive mixture is the second polyamide; and melting the first polyamide treated with the additive mixture.

The particle size distribution for the organic dicarboxylic acid component of the additive may include any combination of the following ranges of sizes and concentrations:
a) from ≥80% (wt.) to ≤99.99% (wt.) of particles scaling from ≥1 micron to ≤800 microns;
b) from ≥85% (wt.) to ≤99.9% (wt.) of particles scaling from 21 micron to ≤780 microns;
c) from ≥92% (wt.) to ≤99.9% (wt.) of particles scaling from ≥5 microns to <750 microns;
d) from ≥92% (wt.) to ≤99% (wt.) of particles scaling from ≥5 microns to ≤750 microns; and
e) from ≥93 (wt.) to ≤99% (wt.) of particles scaling from ≥5 microns to ≤750 microns.

The concentration and particle size distribution for the second polyamide may include combinations of any of the following ranges:
a) from ≥95% (wt.) to ≤99.99% (wt.) of particles scaling ≥250 microns;
b) from ≥96% (wt.) to ≤99.9% (wt.) of particles scaling ≥280 microns;
c) from ≥96.5% (wt.) to ≤99.9% (wt.) of particles scaling ≥300 microns;
d) from ≥97% (wt.) to ≤99.9% (wt.) of particles scaling ≥300; and
e) from ≥97% (wt.) to ≤99% (wt.) of particles scaling ≥300.

The additive can comprise ≥50% (wt.) of the second polyamide, for example ≥50% (wt.) to 99% (wt.), for example, ≥60% (wt.) to 98% (wt.), for example ≥70% (wt.) to 97% (wt.).

The disclosed method provides a system for recycling waste nylon, comprising:
at least one feed stream providing an organic dicarboxylic acid alone or as a dry blend with a polyamide;
at least one feed stream providing the same or different polyamide with at least one feed stream providing waste nylon;
an extruder which accepts the one or more feed streams, conveys the collected feed to a melting zone which melts the feed into a polymer melt, which is extruded;
a control system;
one or more flow control devices which control the feed rate of the one or more feed stream; and
a rheometer configured to measure the melt viscosity of the polymer melt and provide a feedback signal to the control system;
wherein the control system adjusts one or more flow control device based on the melt viscosity measured by the rheometer.

The disclosed method can also provide a more stable composition comprising a solid polyamide having an RV of 45 or greater and a solid organic dicarboxylic acid, wherein 0.01 wt % to 5.0 wt % of the composition is the organic dicarboxylic acid and greater than 50 wt % of the composition is the polyamide.

Advantages, some of which are unexpected, are achieved by various embodiments of the present disclosure. For example, the disclosed method has the advantage of providing an economical, efficient and environmental process for recycling nylon polyamide waste. In various embodiments, the process surprisingly and advantageously recycles even difficult to process waste, such as nylon plop and nylon polyamide having a RV of 70 or greater. The disclosed method provides a solution to the problem that adding nylon plop to a polyamide feed typically results in a commercially unacceptable product having an RV that is too high. In various embodiments, the disclosed method has the advantage of permitting processing of polyamide feed containing significantly greater amounts of nylon plop w % bile producing a product within a commercially acceptable RV range. The disclosed method can advantageously provide recycled polyamide having a low RV.

There are also advantages associated with the various embodiments of additive of the present disclosure. In various embodiments, the disclosed method involves use of a dry, solid chemical additive which results in easier handling and processing. Dry additive avoids or reduces the amount of solvents and low volatility components added to the extruder and thus has the advantage that fewer volatiles are produced during melt polymerization and conveyance. There is also an environmental advantage that use of the additive does not introduce or generate additional waste. In various embodiments, the disclosed method involves use of a single chemical compound as additive, which has the advantage of greatly simplified operations and processing which can be more easily monitored and managed. In various embodiments, the disclosed method involves use of an additive at no more than, e.g., 1.0 wt %, 0.5 wt % or 0.2 wt %, and thus represents only a very minor component of the mixture for recycling. The additive thus has the advantage of reducing the RV while contributes only very minor, if any, deviations from the target specification for the given polyamide. There is also an advantage that the additive is fully consumed during processing and the resulting pelletized products are stable. Moreover, in various embodiments, the additive is a dicarboxylic acid corresponding to monomer in a dimonomeric nylon, e.g., when the polyamide is nylon-6.6 and the dicarboxylic acid is adipic acid. In such embodiments, the additive has the advantage of not introducing any undesired off specification components or monomers to the recycled polymer.

There are also advantages associated with the various embodiments of processing systems of the present disclosure. In various embodiments, the disclosed method provides a method and system of reducing the RV of a polyamide in line a standard polymer extrusion system, comprising, e.g., a mixer, a feed hopper and a screw extruder. That is, various embodiments thereof have the advantage that they can be readily adapted to an existing polyamide processing system by introducing, in line, a polyamide waste feed stream and an organic dicarboxylic acid feed stream. There is an economic advantage of producing more uniform RV product. In various embodiments, the disclosed method involves use of an in-line rheometer which monitors melt viscosity of the polymer melt and provides feedback control to manage the addition rate of feed streams of polyamide waste and an organic dicarboxylic acid additive resulting in tighter control of product RV and less waste, thus having the advantage of a more efficient and economical process.

BRIEF DESCRIPTION OF THE FIGURES

The drawings, which are not necessarily drawn to scale, illustrate generally, by way of example, but not by way of limitation, the disclosed method.

DETAILED DESCRIPTION

Figure 1:
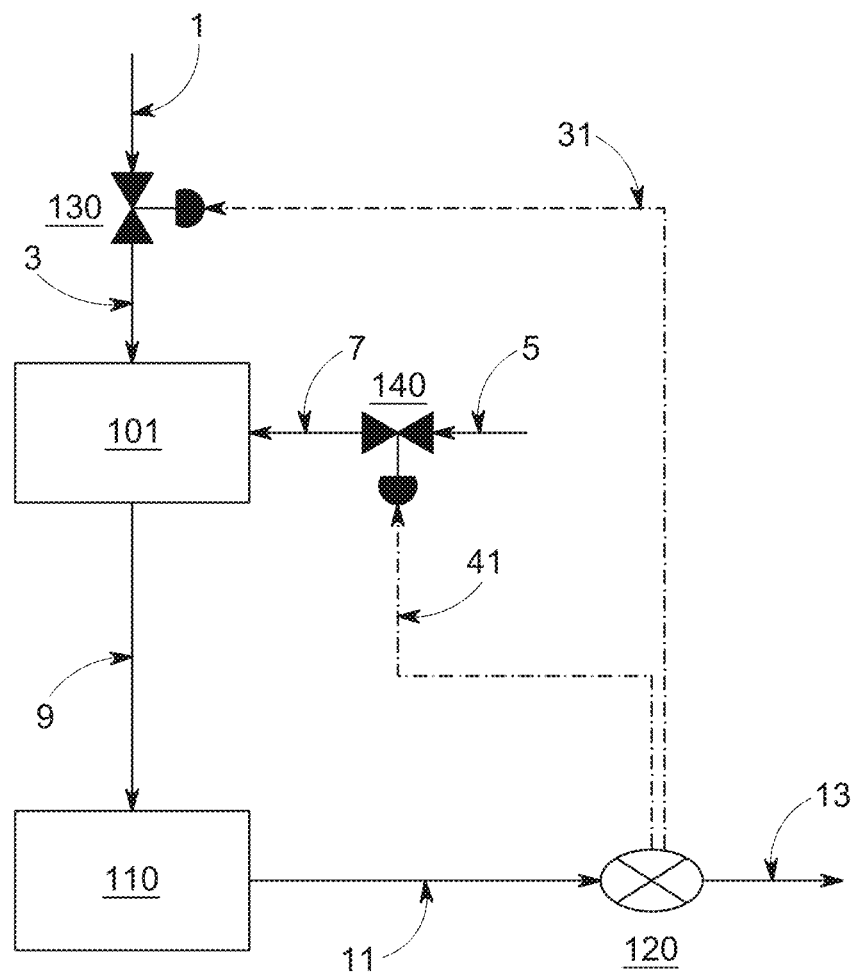
FIG. 1 is a schematic representation of an embodiment of the present disclosure and shows a feedback-controlled process which manages the feed rate of a dicarboxylic acid feed stream and a polyamide feed stream prior to producing a mixed feed stream.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

The term "polyamide" as used herein refers to polymer having repeating units linked by amide bonds. Polyamides may arise from monomers comprising aliphatic, semi-aromatic or aromatic groups. Polyamide includes nylons, e.g., nylon-6,6 (nylon 66) or nylon-6 and may refer to polyamides arising from a single monomer, two different monomers, or three or more different monomers. The term polyamide thus includes dimonomeric polyamides. The polyamide may be a nylon having as monomer units a dicarboxylic acid monomer unit and a diamine monomer unit. For example, if the dicarboxylic acid monomer unit is adipic acid and the diamine is hexamethylene diamine, the resulting polyamide can be nylon-6,6. Nylon-6 is a polyamide having a caprolactam monomer. The polyamide may be copolymers which may be prepared from aqueous solutions or blends of aqueous solutions that contain more than two monomers. In various embodiments, polyamides can be manufactured by polymerization of dicarboxylic acid monomers and diamine monomers. In some cases, polyamides can be produced via polymerization of aminocarboxylic acids, aminonitriles, or lactams. Suitable polyamides include, but are not limited, to those polymerized from the monomer units described herein. In a preferred embodiment, the polyamide is nylon-6,6 (nylon 66).

The dicarboxylic acid monomer unit is suitably at least one dicarboxylic acid of the molecular formula (I): $HO_2C-R^1-CO_2H$ (monomer form); wherein $R^1$ represents a divalent aliphatic, cycloaliphatic or aromatic radical or a covalent bond. $R^1$ suitably comprises from 0 to 20 carbon atoms, for example 2 to 12 carbon atoms, for example 2 to 10 carbon atoms. $R^1$ may be a linear or branched, for example linear, alkylene radical comprising 2 to 12 carbon atoms, or 2 to 10 carbon atoms, for example 2, 4, 6 or 8 carbon atoms, an unsubstituted phenylene radical, or an unsubstituted cyclohexylene radical. Optionally. $R^1$ may contain one or more ether groups. For example, $R^1$ is an alkylene radical, for example a linear alkylene radical, comprising 2 to 12 carbon atoms, or 2 to 10 carbon atoms, for example 2, 4, 6 or 8 carbon atoms. A person of ordinary skill understands that the dicarboxylic acid monomer unit in polymerized form would have the structure $-(CO)-R^1-(CO)-$, i.e., a divalent unit having a carbonyl at each terminal end attached to a neighboring monomer. In the case of nylon-6,6, for example, the linking terminal group would result in an amide linkage. Examples of suitable dicarboxylic acids monomer units include oxalic acid, malonic acid, succinic acid, glutaric acid, pimelic acid, hexane-1,6-dioic acid (adipic acid), octane-1,8-dioic acid (suberic acid), azelaic acid, decane-1,10-dioic acid (sebacic acid), undecanedioic acid, dodecane-1,12-dioic acid, maleic acid, glutaconic acid, traumatic acid, muconic acid, 1,2-cyclohexanedicarboxylic acid, 1,3-cyclohexanedicarboxylic acid, 1,4-cyclohexanedicarboxylic acid, 1,2- or 1,3-phenylenediacetic acids, 1,2- or 1,3-cyclohexane diacetic acids, benzene-1,2-dicarboxylic acid (phthalic acid), benzene-1,3-dicarboxylic acid (isophthalic acid), benzene-1,4-dicarboxylic acid (terephthalic acid), 4,4'-oxybis(benzoic acid), 4,4-benzophenone dicarboxylic acid, 2,6-napthalene dicarboxylic acid, p-t-butyl isophthalic acid and 2,5-furandicarboxylic acid and mixtures thereof. In a preferred embodiment, the dicarboxyic acid monomer unit is adipic acid.

The diamine monomer unit is suitably at least one diamine of the formula (II): $H_2N-R^2-NH_2$; wherein $R^2$ represents a divalent aliphatic, cycloaliphatic or aromatic radical. $R^2$ suitably comprises from 2 to 20 carbon atoms, for example 4 to 12 carbon atoms, for example 4 to 10 carbon atoms. $R^2$ may be a linear or branched, for example linear, alkylene radical comprising 4 to 12 carbon atoms, for example 4 to 10 carbon atoms, for example 4, 6 or 8 carbon atoms, an unsubstituted phenylene radical, or an unsubstituted cyclohexylene radical. Optionally. $R^2$ may contain one or more ether groups. For example, $R^2$ is an alkylene radical, for example a linear alkylene radical, comprising 4 to 12 carbon atoms, or 4 to 10 carbon atoms, for example 2, 4, 6 or 8 carbon atoms. A person of ordinary skill understands that the diamine monomer unit in polymerized form would have the structure $-HN-R^2-NH-$ i.e., a divalent unit having an $-NH-$ group at each terminal end attached to a neighboring monomer. In the case of nylon-6,6, for example, the linking terminal group would result in an amide linkage. Examples of diamines monomer unit include ethylene diamine, trimethylene diamine, tetramethylene diamine (putrescine), pentamethylene diamine (cadaverine), hexamethylene diamine, 2-methyl pentamethylene diamine, heptamethylene diamine, 2-methyl hexamethylene diamine, 3 methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$-$C_4$ alkyl groups, aliphatic polyether diamines and furanic diamines such as 2,5-bis(aminomethyl)furan, xylylenediamine and mixtures thereof. Hexamethylenediamine is the preferred diamine.

The term "organic dicarboxylic acid" means a dicarboxylic acid of the molecular formula (I): $HO_2C-R^1-CO_2H$; wherein $R^1$ represents a divalent hydrocarbyl group, such as aliphatic, cycloaliphatic or aromatic groups, or a covalent bond. $R^1$ suitably comprises from 2 to 20 carbon atoms, for example 2 to 12 carbon atoms, for example 2 to 10 carbon atoms. $R^1$ may be a linear or branched, for example linear, alkylene radical comprising 2 to 12 carbon atoms, or 2 to 10 carbon atoms, for example 2, 4, 6 or 8 carbon atoms, an unsubstituted phenylene radical, or an unsubstituted cyclohexylene radical. Optionally, $R^1$ may contain one or more ether groups. For example, $R^1$ is an alkylene radical, for example a linear alkylene radical, comprising 2 to 12 carbon atoms, or 2 to 10 carbon atoms, for example 2, 4, 6 or 8 carbon atoms. Examples of suitable organic dicarboxylic acids include oxalic acid, malonic acid, succinic acid, glutaric acid, pimelic acid, hexane-1,6-dioic acid (adipic acid), octane-1,8-dioic acid (suberic acid), azelaic acid, decane-1,10-dioic acid (sebacic acid), undecanedioic acid, dodecane-1,12-dioic acid, maleic acid, glutaconic acid, traumatic acid, muconic acid, 1,2-cyclohexanedicarboxylic acid, 1,3-cyclohexanedicarboxylic acid, 1,4-cyclohexanedicarboxylic acid, 1,2- or 1,3-phenylenediacetic acids, 1,2- or 1,3-cyclohexane diacetic acids, benzene-1,2-dicarboxylic acid (phthalic acid), benzene-1,3-dicarboxylic acid (isophthalic acid), benzene-1,4-dicarboxylic acid (terephthalic acid), 4,4'-oxybis (benzoic acid), 4,4-benzophenone dicarboxylic acid, 2,6-napthalene dicarboxylic acid, p-t-butyl isophthalic acid and 2,5-furandicarboxylic acid and mixtures thereof. In a preferred embodiment, the organic dicarboxylic acid is adipic acid.

The term "plop" or "nylon plop" as used herein means fully polymerized nylon that has been extruded into larger chunks and therefore has not been actively cooled to control relative viscosity ("RV"). Plop is typically reject material from a polymerization process. Nylon plop is typically available in quantity as post-industrial material from polymerization facilities. Without being limited by theory, it is believed that because plop is collected in larger chunks, they retain their heat for longer times, furthering the condensation reaction for nylon, thus raising the RV to higher values than deemed acceptable.

The term "granulated plop" or "granulated nylon plop" or "regrind" as used interchangeably herein means size reduction or re-grinding of the nylon plop chunks by any commercially available process consistent with the purpose of the disclosed process. Examples of such commercially available size reduction processes may include mechanical grinding, chopping, comminution, and such. Granulated nylon plop results in easier handling, transportation and processing during the re-melting step. The granulated nylon plop may have regular, random irregular or both particle shapes and certain particle size distribution that can be measured. Solid material size reduction and classification are commercially available techniques for producing ground materials with either broad or narrow size distribution. Such techniques can be implemented in the present disclosure.

The term "relative viscosity" (RV) as used herein refers to the ratio of solution and solvent viscosities measured in a capillary viscometer at 25° C. In one example, RV by ASTM D789-06 is the ratio of viscosity (in centipoises) at 25° C. of 8.4% by weight solution of the polyamide in 90% formic acid (90% by weight formic acid and 10% by weight water) to the viscosity (in centipoises) at 25° C. of 90% formic acid alone. As used herein. RV is measured as an 8.4 wt % solution in 90% formic acid, at room temperature and pressure, unless otherwise indicated. Other methods can be used to determine relative viscosity provided a suitable conversion is used to correctly relate one set of values to another.

The term "solvent" as used herein means a liquid medium that is generally regarded by one ordinarily skilled in the art as having the potential to be capable of solubilizing simple organic and/or inorganic substances. Solvents may be water, organic compounds, silicones, alcohols, ionic liquids, and supercritical fluids. Solvents also include organic solvent or non-aqueous solvent which do not include water.

The term "room temperature" as used herein refers to a temperature of about 15° C. to 28° C.

The polymers described herein can terminate in any suitable way. In some aspects, the polymers can terminate with an end group that is independently chosen from a suitable polymerization initiator, —H, —OH, —NH$_2$, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

All publications, including non-patent literature (e.g., scientific journal articles), patent application publications, and patents mentioned in this specification are incorporated by reference as if each were specifically and individually indicated to be incorporated by reference.

It is understood that the descriptions herein are intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

Method for Recycling Waste Nylon

The disclosed method provides a process for recycling waste nylon by use of an organic dicarboxylic acid additive which has a surprising and advantageous effect of resulting in a recycled nylon product having reduced relative viscosity (RV). Waste nylon, such as plop, is often afflicted with high relative viscosity which renders such nylon unusable for downstream applications. Unfortunately, re-melting or processing such waste is insufficient to solve the problem, typically resulting in products which also suffer from high RV or requiring overcomplicated and uneconomical measures. Plop is a type of high RV waste for which an efficient, economical recycling process is desired. The disclosed method advantageously and unexpectedly provides a solution for reducing the RV of waste nylon, including plop.

The disclosed method provides a method of reducing the relative viscosity (RV) of a nylon polyamide, including nylon plop. In various embodiments, the method involves mixing the polyamide with an organic dicarboxylic acid and melting the resulting polyamide mixture.

The polyamide and the organic dicarboxylic acid can be fed directly to the melting vessel and mixed therein or they can be separately mixed and fed to the melting vessel as a blend. In either case, the mixing does not require solvents or water. That is, the organic dicarboxylic acid can be added directly as a solid to the extrude or it can be dry mixed directly with the polyamide. Likewise, the polyamide can also be a dry, granulated solid. The polyamide and the organic dicarboxylic acid can be fed via a feed stream direct to an extruder or a re-melter; or they may be fed to a pre-mixer to be dry mixed and the resulting dry mix is then fed to the extruder or re-melter. The mixing may be conducted in a re-melter, in extruder itself, in a hopper affixed to the extruder, in a mixer which feeds to the extruder, or in an entirely separate mixing vessel. This pre-mixing process can be performed in line in the process system, but it also can be performed ahead of time, remotely. The disclosed method thus provides a flexible solution for solving the problem of processing high RV waste nylon.

In various embodiments, the organic dicarboxylic acid is already mixed as a dry blend with a polyamide and then fed to a mixer and mixed with additional polyamide or other components. In this embodiment, the polyamide may be the same or different. Thus, the organic dicarboxylic acid may be pre-mixed with the high RV waste nylon as a dry blend, which can be added to a feed system that further mixes with another polyamide, and the combined mixture is fed to an extruder or re-melter for processing. Similarly, the organic dicarboxylic acid may be pre-mixed with commercially-acceptable or low RV polyamide as a dry blend, which can be added to a feed system charged with waste polyamide, the feed system metering out an appropriate amount the pre-mixed organic dicarboxylic acid dry blend to treat the waste polyamide as it is fed to an extruder or re-melter for processing. In some embodiments, the organic dicarboxylic acid may be added directly to the melt zone of an extruder or to a solid conveyance zone immediately prior to the melt zone. In yet further embodiments, the organic dicarboxylic acid is added to an extruder or a re-melter via a hopper which accepts a plurality of feed streams. In some embodiments, mixing further comprises agitating. In yet further embodiments, mixing comprises sampling to assure a homogeneous distribution of ingredients.

In various embodiments, the polyamide and the organic dicarboxylic acid are each substantially free of solvents and mixed together as dry solids. The polyamide may have a moisture content of less than, or about equal to, 1.0%, 0.5%, 0.4%, 0.3%, 0.2%, 0.1%, 0.09%, 0.08%, 0.07%, 0.06%, 0.05%, 0.04%, 0.03%, 0.02%, or less than 0.01%. The organic dicarboxylic acid may have a moisture content of less than, or about equal to, 1.0%, 0.5%, 0.4%, 0.3%, 0.2%, 0.1%, 0.09%, 0.08%, 0.07%, 0.06%, 0.05%, 0.04%, 0.03%, 0.02%, or less than or about equal to 0.01%. In various embodiments, the polyamide is solid. The polyamide can be in the form of pellets, granulate, powder, flakes, chips, or a mixture thereof. The polyamide can comprise granulated plop. Some embodiments of the methods further comprise a step of grinding the polyamide, grinding a component of the polyamide, or grinding plop. In various embodiments, the organic dicarboxylic acid is solid. The organic dicarboxylic acid can be in the form of pellets, granulate, powder, flakes, chips, or a mixture thereof.

In various embodiments, the mixture of polyamide and organic dicarboxylic acid is conveyed to a melt zone and melted. A melt zone is simply an area where the melting process takes places and a melt vessel is simply a container in which the melting takes place. The melt zone can be a melt zone of an extruder, but also may be the heated area of a re-melter. A re-melter, generally, is any device or system designed to re-melt previously polymerized polymer, e.g., for the purpose of recycling. The re-melter may be used to recover constituents or to reprocess a polymer by subjecting it to one or more of heating and cooling cycles. An extruder can be considered a re-melter because it can be configured to reprocess polymerized byproducts. The extruder can be any extruder which contains a melting zone suitable for use with plastics. For example, the extruder can be a screw extruder, such as a single-screw extruder or a twin-screw extruder. The twin-screw extruder may be co-rotating or counter-rotating. The extruder may be part of a continuous system. The extruder subjects the polyamide to elevated temperatures and/or shear forces. In some embodiments, the extruder is a compounder or a combination extruder/compounder. The extruder may be configured to accept a feed stream into a feed zone of barrel comprising one or more screws, convey the feed through the barrel to a melt zone, where the feed is melted and mixed by kneading elements within the barrel to result in a polymer melt; and then convey the melt to a pressure build zone where it exits through the die. The extrudate may be fed into a water bath to cool and to enable it to be pelletized.

In various embodiments, the extruder comprises a feed zone, which accepts and conveys the fed material to the melting zone. The feed zone may be configured to accept multiple (one, two, three, four, five, etc.) feed streams, which may be configured to accept a continuous feed. The extruder may comprise a metering feeder, which controls addition of polyamide feed streams, filler feed streams, additive feed streams, as desired. The extruder also comprises a metering zone, which conveys the melted polymer from the melting zone to be extruded. A rheometer may be positioned at the metering zone or at the extrusion point to monitor viscosity of the polymer melt.

In various embodiments, the extruder comprises a barrel which is heated along its length to temperatures typical and sufficient for melting the fed polymer at the melting zone. In various embodiments, the extruder, or the re-melter, subjects the polyamide to a temperature at or above the melting point of the polyamide being processed. In some embodiments, the temperature is at least, at most, or about equal to, 0° C. 1° C. 2° C., 3° C., 4° C., 5° C., 6° C., 7° C. 8° C., 9° C., 10° C., 11° C., 12° C., 13° C., 14° C., 15° C., 16° C., 17° C. 18° C., 19° C., 20° C., 25° C., 30° C., 35° C., 40° C., 45° C. or 50° C. degrees above the melting point of the polyamide being processed. The melting point of the polyamide can be about 100° C. to about 370° C. about 100° C. to about 310° C., about 100° C. to about 300° C. or about 200° C. to about 300° C. The polyamide copolymer can have a melting point less than or equal to about (e.g., a maximum melting point less than or equal to about) 310° C., 300° C., 295° C., 290° C., 280° C., or about 270° C. or less. For melting nylon 66, the barrel can be heated along its length in zones at temperatures, typically at 270-320° C.

The extruder can be configured to accept a plurality of feed streams, e.g., one or more feed stream of adipic acid or other dicarboxylic acids, one or more feed stream providing a polyamide or polyamide mixture, and one or more feed stream providing a dry blend mixture of a dicarboxylic acid and a polyamide.

The extruder may comprise a side port where fillers, such as but not limited to glass fiber, may be added if desired. The extruder may also comprise degassing zones.

Feedback-Controlled Polyamide Recycling Process and System.

The disclosed method also provides methods and systems for recycling polyamide waste by use of a dicarboxylic acid additive and a melt extruder, and further involving a real-time, active feedback control system. The system provides an active feedback control loop that measures viscosity of the melt and controls the RV of the final product by making adjustments to at least one of the organic dicarboxylic acid feed streams and the polyamide feed stream. Where the system involves multiple polyamide feed streams, e.g., multiple streams providing polyamide having a different RV value and/or multiple streams providing different concentrations of adipic acid, the system can adjust the feed streams in real time to provide a suitable balance of the various polyamides and the organic dicarboxylic acid. In various embodiments, the system provides real-time, active feedback control of an adipic acid feed stream and/or polyamide plop feed stream.

In various embodiments, in-process RV product control can modulate the feed streams of the organic dicarboxylic acid (e.g., adipic acid) and the polyamide (e.g., plop) to not only maintain the appropriate wt % of the organic dicarboxylic acid within the ascribed range, but also to further optimize the delivered amount of organic dicarboxylic acid within said range so as to result in a product having a more targeted RV value.

Adjustment of the component feed rates can be achieved either via a feed of pre-mixed adipic acid with granulated plop balanced against a feed of fiber and pellets, or through the adjustment of granulated plop, fiber, pellets and adipic acid feed rates controlled independently.

To measure viscosity of the melt in real time, and as an in-process check on product stability, an in-line melt rheometer may be employed and incorporated as a closed-loop control of melt viscosity. The output from the in-line melt rheometer, i.e., melt viscosity, may be used to make necessary adjustment on either the adipic acid feed or the pre-mix feed (depending on the method employed). This would result in a tighter control of final product RV.

FIG. 1 is a schematic representation of an embodiment according to the present disclosure. Feed streams 1 and 5 represent the streams containing granulated nylon plop and adipic acid, respectively. There may be other feeds (not shown) comprising nylon fibers, fillers, pellets, etc., depending on the final desired product. Although not shown in FIG. 1, feed streams 1 and 5 may originate from any suitable upstream processing devices that are conventionally available. A process block 101 represents a processing step for preparing a mixed feed stream 9 to a process block 110, wherein further melt polymerization occurs. Block 120 schematically represents a melt rheometer that may be installed and calibrated to determine the melt viscosity of a representative process stream 11 sample that flows out of the process block 110.

The melt viscosity measurement data may be used as a process control input for either independent flow control for a flow control device 130 for Stream 1 via a control feedback signal 31, a flow control device 140 for stream 5 via a control feedback signal 41, or a combination of the two via a feed ratio control to the process block 101. In this way, a tighter RV control of the final product, i.e., process stream 13 may be achieved. The controlled streams that feed to the process block 101 in FIG. 1 are schematically represented by a process stream 3 (from process stream 1 control) and a process stream 7 (from process stream 5 control).

Figure 2:
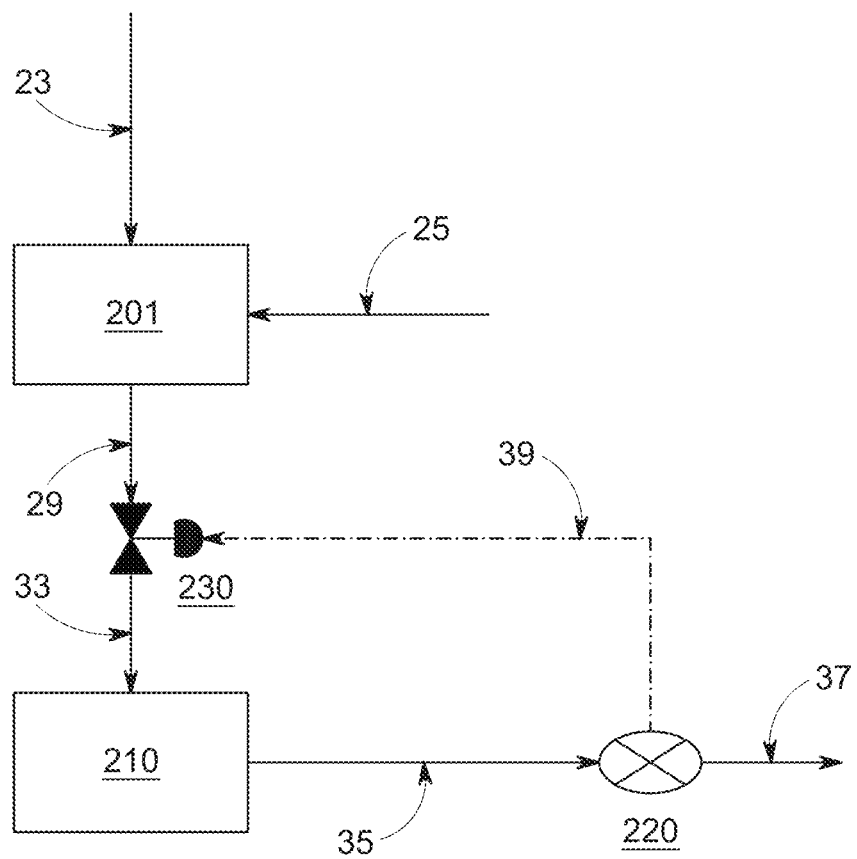
FIG. 2 is a schematic representation of an embodiment of the present disclosure and shows a feedback-controlled process which manages the rate at which a mixed feed stream comprising a dicarboxylic acid blended with a polyamide is fed into a melt polymerization chamber.

FIG. 2 is a schematic representation of another embodiment according to the present disclosure. In FIG. 2, process streams 23 and 25 represent the streams containing granulated nylon plop and adipic acid streams, respectively. There may be other feeds (not shown) comprising nylon fibers, fillers, pellets, etc., and depending on the final desired product. Although not shown in FIG. 2 feed streams 23 and 25 may originate from any suitable upstream processing devices that are conventionally available. A process block 201 represents a processing step for preparing a mixed feed stream 29 which is fed to a flow control device 230. The controlled mixed process stream 33 is fed to a process block 210 wherein further melt polymerization occurs. Block 220 schematically represents a melt rheometer that may be installed and calibrated to determine the melt viscosity of a representative process stream 35 sample that flows out of the process block 210. The melt viscosity measurement data from device 220 may be used as a process control input for the flow control device 230 for process stream 29 via a control feedback signal 39. In this way, a tighter RV control of the final product, i.e., process stream 37 may be achieved.

It is conceivable for those skilled in solids handling that the process block 201 may be separately performed at another location/site with suitable equipment and the resulting mixture 29 comprising streams 23 and 25 may be transported to a location/site where the process block 210 resides. It is not necessary for the process blocks 201 and 210 of FIG. 2 to co-exist at the same location/site. As demonstrated in the examples of this disclosure, the robustness of regrind-acid mixture allows one to prepare and convey the mixture for suitable use between locations/sites.

A skilled person in the field of chemical process control will appreciate that the control signal processing hardware/software are conventionally available in the industry, such as signal amplifiers, signal integrators, Programmable Logic Control (PLC) systems, solid-state relays, and such. These control auxiliary systems, while not shown in FIGS. 1 and 2, are understood to be known in the field.

Similarly, the flow control devices, namely Control Devices 130 and 140 in FIGS. 1 and 230 in FIG. 2, can be of any suitable type available in the industry. Mass or volumetric flow control devices may be used with their proper installation/calibration. The mass flow control devices are generally preferred for process control.

Polyamide

The disclosed method relates to reprocessing polymerized polyamide which has a relative viscosity (RV) higher than desired or acceptable. The polyamide can be any suitable polyamide, including nylon polyamides and nylon copolyamides. For example, the polyamides and copolyamides are derived from diamines and dicarboxylic acids or from aminocarboxylic acids or the corresponding lactams, such as polyamide 4, polyamide 6, polyamide 66, polyamide 610, polyamide 69, polyamide 612, polyamide 46, polyamide 1212, polyamide 11, polyamide 12, semi-aromatic polyamides derived from diamines and dicarboxylic acids, such as and without limitation, m-xylenediamine (MXD) and adipic acid (known in the industry as polyamide MXD6); other semi-polyamides prepared from diamines and dicarboxylic acids, such as and without limitation, hexamethylenediamine and iso- and/or terephthalic acid.

For example the monomers include hexamethylenediamine and adipic acid. For instance, the polyamide can be a polyamide PA 46, PA 66; PA 69; PA 610, PA 612, PA 1012, PA 1212, PA 6, PA 11, PA 12, PA 66/6T, PA 6I/6T, PA DT/6T, PA 66/6I16T, or blends thereof, such as PA6/PA66. The polyamide can be nylon 66 and the composition can optionally be substantially free of all other polyamides (e.g., nylon 66 can be the only polyamide used to form the composition).

The polyamide can be obtained from a variety of sources and can be a mixture of polyamide obtained from multiple sources. Sources include polyamide fiber, polyamide pellets and polyamide plop. Other sources include post-industrial polyamide, polyamide scrapped from the inside of processing units and post-consumer polyamide. In some embodiments, the polyamide has already been subjected to a recycling process but still requires further processing to meet acceptable RV limits. In various embodiments, the polyamide may have a relative viscosity which is outside the product specification for commercial sale or outside the specification for downstream industrial use.

The weight average feed RV for ground plop may range from $\geq 30$ to $\leq 140$, for example from $\geq 45$ to $\leq 100$, for example from $\geq 60$ to $\leq 90$. The formic acid method is used as a basis for RV measurement data When the polyamide is a mixture of polyamides, the component polyamides may have different RV values from each other and from the mixture as a whole. In the case of a polyamide mixture, the polyamide can be understood to have an overall RV value, which may, when suitable, be determined as an average of multiple RV values taken to more accurately reflect the viscosity of the overall mixture. At the same time, the polyamide components of the mixture can be understood to have their own component RV values. Such component RV values can be determined by measuring the RV of the isolated polyamide component, e.g., prior to preparing the polyamide mixture. The overall RV value for the mixture and also the component RV values for a given component can each be in line with the values listed above.

In various embodiments, the polyamide is a mixture of one or more polyamide components, wherein at least one polyamide component has an RV of 30, 35, 40, 45, 50, 55, 60, 65, 70, 75, 80, 85, 90 or greater and said component is present at greater or equal to 10, 20, 25, 30, 35, 40, 45, 50, 55, 60, 65, 70, 75, 80, 85, 90 or 95 wt % of the polyamide mixture.

In various embodiments, the polyamide is a mixture of high RV polyamide mixed with polyamide having an RV within acceptable limits. e.g., within product specification, or mixed with commercially acceptable polyamide. The polyamide can be a mixture of high RV polyamide mixed with low RV polyamide. The high RV polyamide can include polyamide plop, polyamide waste fibers, post-industrial polyamide, polyamide scrapped from the inside of processing units and post-consumer polyamide. In various embodiments, the high RV polyamide is plop.

It should be understood that high RV polyamide represents various polyamides, each which may be defined by a different range of RV values, which may or may not overlap with other high RV polyamides. For example, a polyamide which is from a batch of off-specification nylon may have a RV value of 250 to <70, while a polyamide which is nylon plop may have an RV value of 270 to <90. As a further example, a mixture of such polyamides could be further mixed a commercially acceptable polyamide or a polyamide having a low RV. Such low RV polyamide may have an RV which is greater than, equal to, or about equal to 20, 21, 22, 23, 24, 25, 26, 27, 29, 29 or 30. In various embodiments, the low RV polyamide has a relative viscosity (RV) which is less than 31, 32, 33, 34 or 35. Thus, the low RV polyamide has value greater than (>) or greater or equal to (≥) 20, 21, 22, 23, 24, 25, 26, 27, 29, 29 or 30 and also less than (<) or less than or equal to (≤) 31, 32, 33, 34 or 35. The low RV polyamide may also be within a range of RV corresponding to any combination of the listed RV values. For example, the low polyamide may have RV of ≥22 to ≤36, an RV of ≥20 to ≤33, or an RV of ≥30 to ≤35.

The polyamide may contain 0 wt % to 100 wt % of high RV polyamide. The percentage of nylon-6,6 mixture that is made up of ground plop is a significant variable on control of product RV. In some embodiments, the percentage may range from ≥0% to ≤100%, for example from ≥20% to ≤80%, for example from ≥30% to ≤50%. The polyamide may contain an amount of high RV polyamide at least, equal to, or greater than 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 97 wt %, 98 wt %, 99 wt %, 99.5 wt % or 99.9 wt %. The amount of high RV polyamide may be less than 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 97 wt %, 98 wt %, 99 wt %, 99.5 wt % or 99.9 wt %. The amount of high RV polyamide component in the polyamide may be within a range of wt % corresponding to any combination of the wt %, for example, ≥20 wt % to ≤80 wt %; ≥30 wt % to ≤80 wt %; ≥20 wt % to ≤50 wt %, or ≥30 wt % to ≤50 wt %.

The polyamide may contain an amount of plop at least, equal to, or greater than 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 97 wt %, 98 wt %, 99 wt %, 99.5 wt % or 99.9 wt %. The amount of plop may be less than 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 97 wt %, 98 wt %, 99 wt %, 99.5 wt % or 99.9 wt %. The amount of plop component in the polyamide may be within a range of wt % corresponding to any combination of the listed wt %, for example, ≥20 wt % to ≤80 wt %; ≥30 wt % to ≤80 wt %; ≥20 wt % to ≤50 wt %; or ≥30 wt % to ≤50 wt %.

Organic Dicarboxylic Acid

The organic dicarboxylic acid has a molecular formula (I): $HO_2C-R^1-CO_2H$; wherein $R^1$ represents a divalent aliphatic, cycloaliphatic or aromatic radical or a covalent bond. In various embodiments, $R^1$ can be a linear alkylene radical comprising 2 to 12 carbon atoms; $R^1$ can be a phenylene or naphthylene divalent radical; $R^1$ can be a divalent cyclohexyl radical; or $R^1$ can be any combination thereof such as a linear alkylene radical comprising 2 to 12 carbons, interrupted by a phenylene group. Specific examples of suitable dicarboxylic acids include hexane-1, 6-dioic acid (adipic acid), octane-1,8-dioic acid (suberic acid), decane-1,10-dioic acid (sebacic acid), dodecane-1,12-dioic acid, 1,2-cyclohexanedicarboxylic acid, 1,3-cyclohexanedicarboxylic acid, 1,4-cyclohexanedicarboxylic acid, 1,2-cyclohexanediacetic acid, 1,3-cyclohexanediacetic acid, benzene-1,2-dicarboxylic acid (phthalic acid), benzene-1,3-dicarboxylic acid (isophthalic acid), benzene-1,4-dicarboxylic acid (terephthalic acid), 4,4'-oxybis(benzoic acid), and 2,6-naphthalene dicarboxylic acid.

In various embodiments, the organic dicarboxylic acid is adipic acid.

In various embodiments, the organic dicarboxylic acid is a precursor to adipic acid, such as a precursor which produces adipic acid under the conditions of the extruder.

In various embodiments, the organic dicarboxylic acid has the same structure as a monomer of the polyamide to be treated. For example, when the polyamide to be treated is nylon-6,6, the organic dicarboxylic acid can, in various embodiments, be adipic acid. As another example, when the polyamide is nylon 510, the organic dicarboxylic acid can, in various embodiments, be sebacic acid.

In various embodiments of the disclosed method, the organic dicarboxylic acid is provided to the polyamide being reprocessed to result in about 0.01 wt % to 1.0 wt % of organic dicarboxylic acid in the polyamide. The resulting mixture may have a wt % of organic dicarboxylic acid ranging from 0.01 wt % to ≤1.0 wt %, from ≥0.05 wt % to ≤0.5 wt %, from ≥0.1 wt % to about <0.5 wt %, for example, less than, greater than, or equal to about 0.02 wt %, 0.03 wt %, 0.04 wt %, 0.05 wt %, 0.06 wt %, 0.07 wt %, 0.08 wt %, 0.09 wt %, 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, 0.20 wt %, 0.21 wt %, 0.22 wt %, 0.23 wt %, 0.24 wt %, 0.25 wt %, 0.26 wt %, 0.27 wt %, 0.28 wt %, 0.29 wt %, 0.30 wt %, 0.31 wt %, 0.32 wt %, 0.33 wt %, 0.34 wt %, 0.35 wt %, 0.36 wt %, 0.37 wt %, 0.38 wt %, 0.39 wt %, 0.40 wt %, 0.41 wt %, 0.42 wt %, 0.43 wt %, 0.44 wt %, 0.45 wt %, 0.46 wt %, 0.47 wt %, 0.48 wt %, 0.5 wt %, 0.55 wt %, 0.60 wt %, 0.65 wt %, 0.70 wt %, 0.75 wt %, 0.80 wt %, 0.85 wt %, 0.90 wt %, or 0.95 wt %. In various embodiments, the organic dicarboxylic acid is added to a wt % greater than, equal to, or about equal to, 0.01 wt %, yet in certain other embodiments the organic dicarboxylic acid may be provided to a wt % less than 0.01 wt %.

Additives

The disclosed method also provides an additive for treating waste nylon and nylon having high relative viscosity (RV). The additive lowers the RV of a treated polyamide upon melting of the polyamide during extrusion. Use of the additive for polyamide reprocessing results in a polyamide product having reduced RV. The disclosed method also provides a stable composition comprising an organic dicarboxylic acid and a polyamide, which can be used as a primary feedstock or as supplemental additive for polyamide processing. The compositions described herein are generally useful in the nylon recycling industry and have the advantage of being stable compositions which can be prepared in advance, stored, transported.

The present application provides, in various embodiments, additives and other stable compositions which are dry, solid compositions comprising an organic dicarboxylic acid and a polyamide.

The organic dicarboxylic acid may be present at any convenient loading with the polyamide. For example, the organic dicarboxylic acid can range from about ≥0.01 wt % to about ≤1.0 wt %, for example from ≥0.05 wt % to ≤0.5 wt %, for example from ≥0.1 wt % to ≤0.5 wt %, can be less than, greater than, or about 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, 0.20 wt %, 0.21 wt %, 0.22 wt %, 0.23 wt %, 0.24 wt %, 0.25 wt %, 0.26 wt %, 0.27 wt %, 0.28 wt %, 0.29 wt %, 0.30 wt %, 0.31 wt %, 0.32 wt %, 0.33 wt %, 0.34 wt %, 0.35 wt %, 0.36 wt %, 0.37 wt %, 0.38 wt %, 0.39 wt %, 0.40 wt %, 0.41 wt %, 0.42 wt %, 0.43 wt %, 0.44 wt %, 0.45 wt %, 0.46 wt %, 0.47 wt %, 0.48 wt %, 0.5 wt %, 0.55 wt %, 0.60 wt %, 0.65 wt %, 0.70 wt %, 0.75 wt %, 0.80 wt %, 0.85 wt %, 0.90 wt %, or 0.95 wt %, 1 wt %, 2 wt %, 3 wt %, 4 wt %, 5 wt %, 6 wt %, 7 wt %, 8 wt %, 9 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, 99 wt % or 99.9 wt % of the composition. The organic dicarboxylic acid is defined above and thus has the molecular formula (I): $HO_2C-R^1-CO_2H$; wherein $R^1$ represents a divalent aliphatic, cycloaliphatic or aromatic radical or a covalent bond. For example, the organic dicarboxylic acid is adipic acid.

The polyamide in the composition can be any suitable polyamide. For example, the polyamide can be nylon-6,6. The polyamide can be the same as polyamide for which the additive is intended to treat, or it may be different. The polyamide can have any suitable RV, and it can be commercial-acceptable polyamide, low RV polyamide or high RV polyamide. The polyamide can comprise waste polyamide, including plop. In some embodiments, the polyamide of the composition may be entirely polyamide plop.

In various embodiments, the polyamide in the composition has a relative viscosity (RV) range from ≥30 to ≤140, for example from ≥45 to ≤100, for example from ≥60 to ≤90, which is less than, equal to, or greater than about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90, 91, 92, 93, 94, 95, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138 or 139 or less than or equal to 140.

The polyamide may be present at any amount, but, if present, is typically present at an amount greater than 50 wt %. For example, the polyamide can be less than, greater than, or about 50 wt %, 55 wt %, 60 wt %, 65 wt %, 70 wt %, 75 wt %, 80 wt %, 85 wt %, 90 wt %, 95 wt %, 99 wt %, 99.5 wt %, 99.9 wt % or 99.99 wt % of the composition.

In some embodiments, the composition consists essentially of an organic dicarboxylic acid. e.g., adipic acid, and a polyamide. In other embodiments, the composition consists essentially of an organic dicarboxylic acid only. In some embodiments, the additive or other compositions consist essentially of a dry blend of an organic dicarboxylic acid and polyamide.

In various embodiments, the polyamide is present at a higher wt % of the composition than the organic dicarboxylic acid.

The composition is a solid in the form of pellets, granulate, flakes, chips or powder. The additive may correspond to the particle size and shape of the polyamide to be processed.

In various embodiments, the composition is substantially free of solvent or moisture. In various embodiments, the composition is free of small molecules (e.g., having a molecule weight below 300) capable of reacting with the organic dicarboxylic acid in a condensation reaction. For example, the composition is free of monoamines, aminols and alcohols. In some embodiments, the composition is free of non-polyamide polymer. In some embodiments, the composition is free of unreactive filler.

In various embodiments, the composition comprising a solid polyamide having an RV of 45 or greater and a solid organic dicarboxylic acid, wherein 0.01 wt % to 5.0 wt % of the composition is the organic dicarboxylic acid and greater than 50 wt % of the composition is the polyamide.

In various embodiments, the polyamide in the composition contains a diamine monomer and a dicarboxylic acid monomer, and the dicarboxylic acid monomer is the same as the organic dicarboxylic acid in the composition.

In a related embodiment, the disclosed method provides a recycle-ready waste polyamide, comprising waste polyamide and about 0.01 wt % to 1.0 wt % of the dicarboxylic acid, e.g., adipic acid. The waste polyamide may be high RV polyamide. The waste polyamide may comprise plop. The recycle-ready waste polyamide may consist essentially of a dry blend of granulated plop and 0.01 wt % to 5.0 wt % of the dicarboxylic acid.

EXAMPLES

Various aspects of the present disclosure can be better understood by reference to the following Examples which are offered by way of illustration. The present disclosure is not limited to the Examples given herein.

Analytical Methods
Relative Viscosity (RV)

The polyamides described herein each have a relative viscosity (RV) or range thereof. Relative viscosity is the ratio of the viscosity of the solution to the viscosity of the solvent used. For polyamides, RV is measured as an 8.4 wt % solution in 90% formic acid, at room temperature and pressure, unless otherwise indicated. Other methods of determining the RV, such as a 1 wt % solution in concentrated sulfuric acid, may be equivalently used and resulting values compared provided an appropriate correlation of RVs between the method used and the 8.4 wt % in 90% formic acid method, used herein, can be determined.

An alternative method of determining the RV is to measure the Viscosity Number (VN, sometime referred to as Viscosity Index) of the polyamide according to ISO 307 and use the conversion relationships for N66 within the ISO standard to convert the VN to RV. In the case of N66, by way of non-limiting example, a VN (determined as a 0.5 w % solution in 96% sulphuric acid) of 83.93 corresponds to an RV of 25. The ISO standard gives an equation for the interconversion as VN=−206.52124+90.23355×ln(RV). Using this equation, an RV of 22 would correspond to a VN of about 72.4 ml/g, and an RV of 36 would correspond to a VN of 116.8 ml/g. Strictly speaking, this relationship is for N66, but for the purposes herein may be applied to other polyamides being useful to do so when the polyamide has poor solubility characteristics in 90% formic acid but may be dissolved as a 0.5 w % solution in 96% sulphuric acid for solution viscosity determinations. For example, Viscosity Index (also called Viscosity Number) according to ISO 307 is a solution viscosity measured at 0.5 w % in 96% sulphuric acid. In EN ISO 307:2007, a formula is given on page 29 for the relationship between Viscosity Number (VN) and RV: VN=−206.52124+90.23355×ln(RV); therefore, RV=exp((VN+206.52124)/90.23355)).

Notched Charpy Impact

Notched Charpy Impact strength measurements are taken in accordance with ISO 179-1, using injection-molded specimens, with bar dimensions notch dimensions specified by this same standard. Impact breaks are taken along the edgewise orientation. Measurements are taken in kJ/m².

Melt Rheology Testing

Melt rheology testing is done in accordance with ASTM D3835. A capillary rheometer is used to melt pellets at temperatures ranging 280-290° C. Testing is done either under a shear sweep profile, ranging from within 10 s$^{-1}$ to 1,000 s$^{-1}$ or under a constant shear rate within that range for a fixed duration. Shear viscosity is reported in Pa·s.

Melt rheometers for measuring polymer melt viscosity are commercially available. These may be installed and operated off-line, in-line or on-line. Examples may include, and not limited to, piston extrusion rheometers, screw extrusion rheometers, rotational viscometers, falling ball viscometers, rolling ball viscometers, ultrasonic viscometers, and such. Suitable examples for commercial application may include, and not limited to, melt flow indexers, capillary rheometers, single screw rheometers, inline ViscoSensor rheometer available from Dynisco. Goettfert capillary rheometer for online quality control and monitoring, HAAKE online rheometer, AMETEK Brookfield rheometers, and other types. A skilled person in the field of polymer melt viscometry will consider several such factors as process line flow pattern requirements (laminar versus turbulent), temperature conditions (isothermal or non-isothermal), operational simplicity, sample amount requirements, test time, precision, accuracy, cost, in selecting what type of rheometer is suitable for application.

Particle Size Distribution Measurement

A sieve-screen shaker; Model—W. S. Tyler RX-86-1 Sieve shaker, 8-inch diameter sieves, 220 VAC, 50/60 Hz, was used for the determination of particle size distribution. This shaker is ideal for testing samples with materials coarser than 100 mesh (150 μm). The shaker offers a built-in, 99-minute timer with automatic shutoff. The shaker holds up to six full-height or thirteen half-height, 8" diameter sieves with bottom pan and cover. It's base measures 25"L×19"W×15"H.

For size distribution characterizations, a known amount of sample, either regrind or adipic acid, was weighed out. A collection of sieve screens, ranging from 2 mm down to 106 microns in screen size were selected for the analysis. Prior to sieving, each of the screens were thoroughly cleaned, dried, and tare weights were collected for each. The screens were stacked on the sieve shake table from smallest to largest screen size, along with a pan at the bottom and a lid at the top of the stack. The pre-weighed sample was then placed on the top-most screen and the assembly was shaken for four minutes per sample. After shaking, the sieves were unstacked and then weighed. The initial weights of the screens were subtracted from the final weights to calculate the collected weight on each screen.

Organic Dicarboxylic Acid Content Determination

About 30 grams of regrind material containing known amount of organic dicarboxylic acid (adipic acid) was added to 250 mL water. The mixture pH was measured using a pH probe [Sension+MM 378 GLP 2 channel Laboratory Meter for pH] after stirring for approximately 5 minutes at room temperature. The acid content in the regrind material was varied between 0.1 to 0.5 wt. % and calibration curve was developed between the Solution pH and wt. % acid in regrind material. This calibration curve was used to determine the acid content in all regrind samples according to this disclosure. The calibration curve ($R^2$=0.983) is given below:

$$[\text{Solution pH}] = -0.275 \cdot \text{Ln}[\text{wt. \% acid in regrind}] + 3.2646$$

As an illustration, for the measured solution pH of 3.6, the wt. % of acid in regrind is determined to be 0.295 wt. %. FIG. A represents the calibration result.

Materials
Adipic Acid

Adipic acid (CAS No. 124-04-9) is a commercially available product from Sigma-Aldrich, purity >99.8% by weight.

Nylon-6,6 Plop

Nylon 6,6 plop starting material is post-industrial recycle material made at a commercial polyamide production site of INVISTA. The plop was ground to a size suitable for handling during re-processing-typically, with less than 3% (by weight) of the sampled particles ≤300 microns size, of which, less than 1% (by weight) of the sampled particles ≤106 microns in size.

Example 1

A mixture of adipic acid with nylon plop granulate was prepared using a twin-screw extruder (TSE) for combining and re-melting the mixture. The TSE used was a Coperion ZSK 25 MEGAlab twin-screw extruder. The nylon plop was granulated at a local regrinding facility in Chattanooga, TN. Physical properties of granulate are similar to the original nylon plop material used.

An adipic acid feed and a 100% granulated nylon-6,6 plop feed were each fed to the first barrel section of the twin screw using a metering feeder. The resulting mixture was conveyed through the barrel which was heated in zones at temperatures in the range of 270-320° C., which is the typical temperature for melting nylon-6,6 (i.e., heated at temperature 0-50° C. higher than the 268.8° C. melting point of nylon-6,6). The mixture was further conveyed through the TSE then extruded and pelletized. A range of adipic acid content between 0 wt % and 2.0 wt % as set forth in Table 1 were tested by varying the amount of adipic acid fed into the TSE.

TABLE 1

| Example # | Adipic Acid (wt %) | Granulated nylon plop (wt %) |
|---|---|---|
| 1 (a) | 0 | 100 |
| 1 (b) | 0.5 | 99.5 |
| 1 (c) | 1.0 | 99.0 |
| 1 (d) | 1.5 | 98.5 |
| 1 (e) | 2.0 | 98.0 |

The pelletized product produced from the TSE compounding step were then dried in a vacuum oven at 80° C. for 10 hours under continuous nitrogen gas purging to achieve a target moisture level of around 0.20 wt % and to ensure that adipic acid was reacted to completion. A lab-scale Sartorius moisture analyzer was used to determine moisture levels in the test samples.

The results showed that the RV of the re-melted pellets was reduced as the adipic acid content was increased.

The dried pellets were then further analyzed to determine whether the effect of the adipic acid continued after extrusion and pelletization. The dried pellets were melted and run through a rheometer at 280° C. running through a shear profile of 10 s$^{-1}$ to 1000 s$^{-1}$. The rheometer used in this example was a capillary rheometer made by Malvern Instruments (Model No. Rosand RH2100) having a 15-mm diameter single bore, and a tungsten carbide die with 2-mm diameter. About 50 grams of sample was packed into the rheometer bore after temperature equilibrium was established. After 4 minutes of melting, the sample was compressed, and the shear sweep program began. The rheometer extrudate was checked for RV to monitor whether the change in RV was drastically different for increasing adipic acid addition. No trend was observed between the extrudate and the compounded pellets, which may indicate complete reaction for the added adipic acid.

Table 2 also clearly shows that addition of adipic acid to 100% granulated nylon-6,6 plop results in a recycled nylon having reduced relative viscosity (RV). For example, whereas the tested granulated nylon plop (100 wt %) had a relative viscosity of 80 [Ex. 1(a)], use of 0.5 wt % adipic acid resulted in a drastically lower RV of 48.20 [Ex. 1(b)]. The rheometer extrudate was only slightly lower at 38.41 thus showing that 0.5 wt % adipic acid achieves stable pellets which result in a RV vastly improved for further industrial use.

TABLE 2

| Example # | Adipic Acid wt % | Initial RV of Pellets from TSE Compounding | Moisture Level (wt %) in dried pellet | RV of Rheometer Extrudate |
|---|---|---|---|---|
| 1 (a) | 0 | 80.00 | 0.195 | 70.55 |
| 1 (b) | 0.5 | 48.20 | 0.180 | 38.41 |
| 1 (c) | 1.0 | 37.10 | 0.188 | 26.89 |
| 1 (d) | 1.5 | 31.74 | 0.163 | 22.51 |
| 1 (e) | 2.0 | 25.73 | 0.173 | 16.74 |

Example 2

Example 2 was performed the same as that described in Example 1, except that amount of recycled, granulated nylon plop compounded was varied between 75% and 100% and adipic acid was pre-blended with nylon 66 pellets at 5 wt % level and the amount of the adipic acid-nylon-6,6 blend was varied between 0% and 25%. The net adipic acid level in the final product ranged between 0 wt % and 1.25 wt %.

RV values and Notched Charpy Impact strength measurements were taken from the resulting product of each tested sample. Table 3 below provides the data summary for Example 2.

TABLE 3

| Component | 2 (a) | 2 (b) | 2 (c) | 2 (d) | 2 (e) | 2 (f) |
|---|---|---|---|---|---|---|
| Recycled Nylon Plop | 100% | 95% | 90% | 85% | 80% | 75% |
| Adipic Acid:Nylon 66 pellets at 5:95 by weight in the blend | — | 5% | 10% | 15% | 20% | 25% |
| Adipic Acid in final product, wt % | — | 0.25% | 0.5% | 0.75% | 1.0% | 1.25% |
| RV (Formic acid method) | 62.8 | 46.9 | 37.9 | 33.0 | 28.9 | 26.1 |
| Notched Charpy Impact Strength (kJ/m$^2$) [ISO 179-1] | 4.8 | 4.7 | 4.1 | 2.9 | 2.6 | 1.7 |

As shown in Table 3, waste nylon plop can be recycled into a material having a greatly reduced relative viscosity (RV) by addition of as little as 0.25% adipic acid. Table 3 also shows that Notched Charpy Impact Strength shows a sharp reduction in impact strength above 0.5% adipic acid and above 1.0% adipic acid as greater concentrations of adipic acid are used.

Example 3

Several nylon blend samples were re-melted using a single-screw extruder (SSE) with a L/D ratio of 32, rotating at 120 RPM. The nylon samples were re-melted, extruded and pelletized. Each sample contained 30% granulated nylon plop with varying amounts of adipic acid. The adipic acid in the final product ranged between 0.05 wt % to 0.15 wt %. Table 4 shows the adipic acid content and the resulting RV of the melted product.

TABLE 4

| Example # | Adipic Acid in final product, wt % | RV |
|---|---|---|
| 3 (a) | 0 | 57.5 |
| 3 (b) | 0.05 | 55.8 |
| 3 (c) | 0.10 | 47.3 |
| 3 (d) | 0.15 | 46.8 |

As shown in Table 4, small amounts of adipic acid added to recycled nylon resulted in measurable improvements for decreasing relative viscosity. Relative viscosity is substantially reduced upon addition of greater than 0.05 wt % adipic acid or addition of at least 0.10 wt % adipic acid.

Example 4

The products prepared according to Example 3 were further tested to evaluate product stability and to evaluate whether unreacted adipic acid remained in the final product after melt-processing. Each compound mixture was evaluated in the melt phase and shear viscosity was measured at fixed temperature and shear rate. Because the presence of adipic acid results in decreased viscosity, it was considered that a continued rapid decrease in shear viscosity over time would be indicative of remaining, reactive adipic acid.

The final product was pelletized and about 20-30 g for each sample was tested in a capillary rheometer (Kayeness-Dynisco, model 36052M-113, single bore. Z394-20 die, 1-mm die diameter) by heating the pellets to 285° C. with about 4 minutes of time allowed for melting. A constant shear rate of 401.3 $s^{-1}$ was applied to the melted specimen over an additional 9 minutes of time. Twelve measurements were taken within each time series to monitor any changes in the viscosity.

Table 4 below tabulates the data collected for samples that were tested with and without drying to account for moisture effect. For each sample, the measured viscosity (Y-axis in Pa·s) values were plotted versus the time (X-axis in minutes). The slopes of straight line fits for each sample determined the rate of viscosity change over time (in Pa·s/min), which is tabulated in the last column of Table 4. The term "Pa·s" means a unit of viscosity measurement in Pascal*second.

TABLE 5

| Example # | Adipic Acid in final product, wt % | Moisture Level (wt %) | Rate of viscosity change over time Pa · s/min |
|---|---|---|---|
| NO DRYING | | | |
| 4 (a) | 0.0 | 0.31 | −6.7 |
| 4 (b) | [Control] | 0.28 | −7.17 |
| 4 (c) | 0.05 | 0.10 | −4.22 |
| 4 (d) | 0.10 | 0.17 | −4.84 |
| 4 (e) | 0.15 | 0.14 | −1.69 |
| WITH DRYING | | | |
| 4 (f) | 0.0 | 0.04 | −0.16 |
| 4 (g) | [Control] | 0.04 | 1.1 |
| 4 (h) | 0.05 | 0.05 | 0.61 |
| 4 (i) | 0.10 | 0.03 | 3.73 |
| 4 (j) | 0.15 | 0.04 | 2.76 |

As shown in Table 5, the samples behaved similarly in terms of change in viscosity, either without or with drying, independently of the adipic acid levels tested. It was observed that the moisture level in the product samples appears to be the dominant factor on viscosity change.

Figure 3:
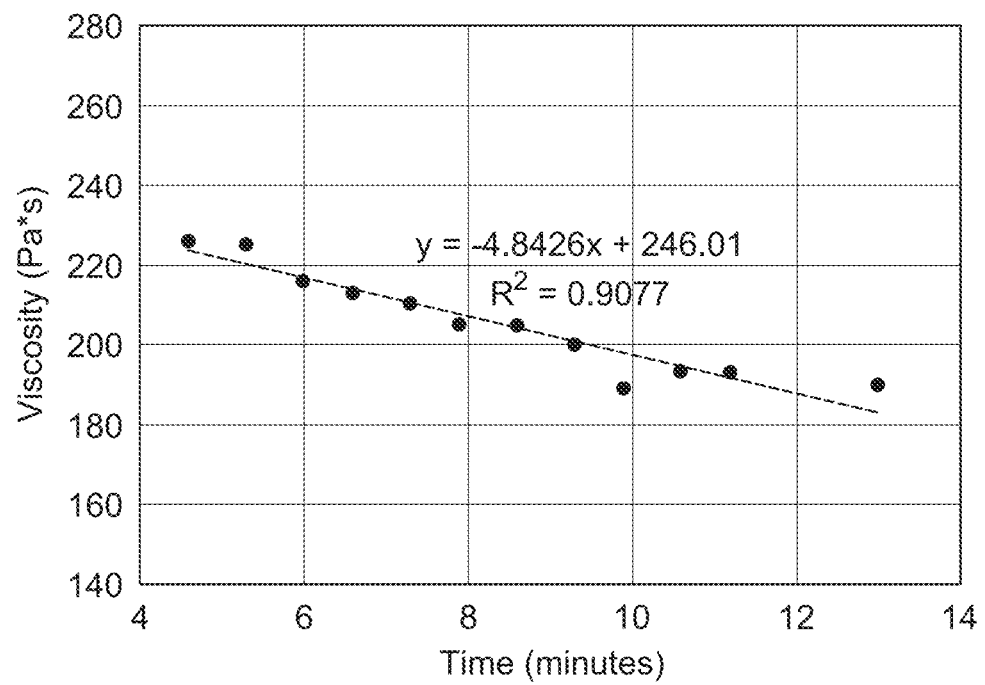
FIG. 3 shows how viscosity changes over time for undried pellets of polyamide treated with adipic acid, in accordance with various embodiments.
Figure 4:
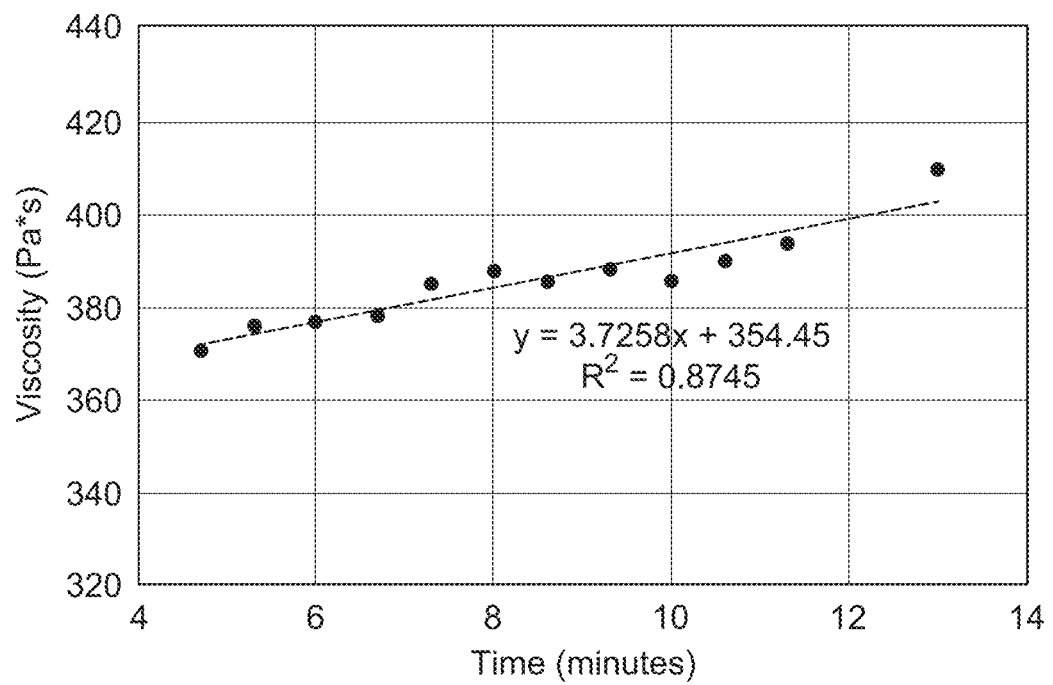
FIG. 4 shows how viscosity changes over time for dried pellets of polyamide treated with adipic acid, in accordance with various embodiments.
Figure 5:
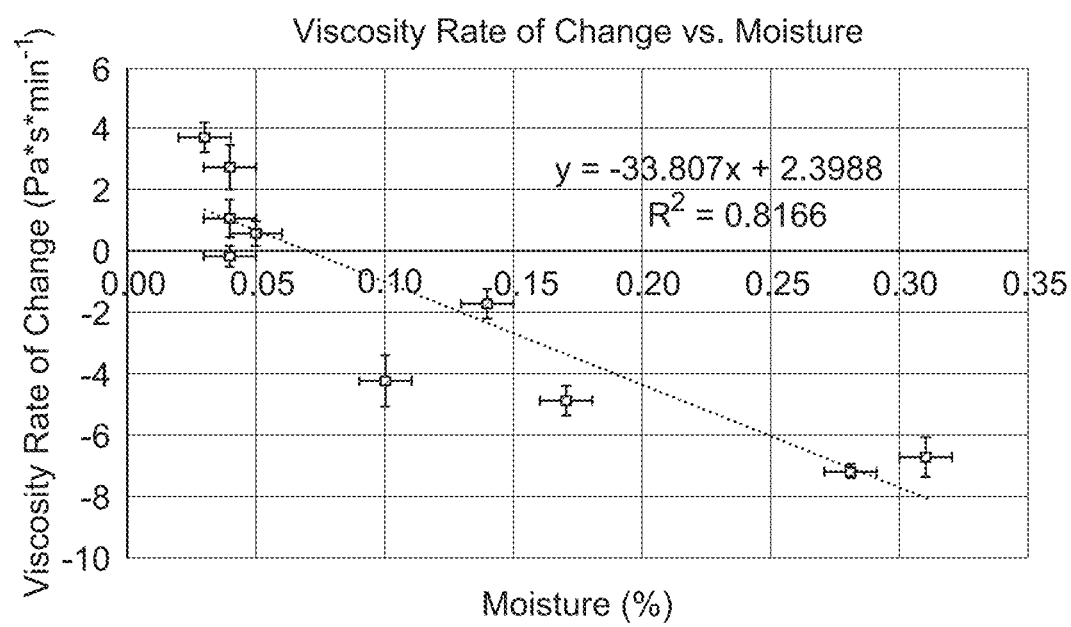
FIG. 5 shows that viscosity rate of change is primarily moisture dependent and is not the result of adipic acid treatment, in accordance with various embodiments.

FIG. 3 is a representation of the measured melt viscosity-time profile for Example 4(d) of Table 4. FIG. 4 is a representation of the measured melt viscosity-time profile for Example 4(i) of Table 4. In FIG. 5, the viscosity rate of change (Y-axis in Pa·s/min) is plotted against the measured moisture level (X-axis in wt %) for the Table 4 samples. The change of viscosity rate was observed to be correlated with the moisture level, and not with the adipic acid loading.

Example 5

This example investigates whether dry mixing adipic acid solids with granulated nylon plot results in settling of the adipic acid to the bottom of the container, e.g., upon agitation or shaking. Agitation or shaking is typically experienced during the movement of solid-filled containers during shipment, loading and unloading.

Ground nylon plop was taken directly from the grinding facility at the INVISTA facility in Camden, SC. This was then mixed with adipic acid solids to yield about 0.3 wt % adipic acid level in the final product. The mixture was held in a 1.5-gallon transparent container. A vibrating sifting table was used to simulate agitation that would be experienced during transport and handling. Vibration of the samples took place for about 6 hours on each test sample including controls. As a measure of uniformity of adipic acid in the unagitated initial state, the mixture was sampled at the top and bottom and each sample was then run through a melt extruder (Labtech LTE-16-44FAC, 16-mm TSE with L/D of 44, 300 RPM, includes water bath and strand pelletizer). The RVs for the pellets obtained from the melt extrusion step were measured in each sample case. The RV measurement is a reasonable proxy determination of adipic acid uniformity within the regrind.

The experiment was repeated for each sample that had 0.3 wt % adipic acid level. Comparison of sample RV measurements corresponding to the mixed-and-unagitated versus mixed-and-agitated adipic acid/granulate dry mixtures was made to determine whether any of the added adipic acid settled at the bottom of the container. If there was any adipic acid settlement in the dry granulate nylon plop mixing stage (agitated or not), it would be reasonable to expect some trend in the RV value across the sampled locations in the container. As an example, one would experience a much lower RV value for the bottom location sample compared to the RV for top location sample, if significant adipic acid settled to the container bottom, and thereby, artificially increasing the local adipic acid level in the bottom sample.

Measurement of granulate RV without adipic acid addition was also taken for reference. Table 6 below shows the data summary for the samples tested in these examples.

TABLE 6

| Example # | Sample Description | Adipic Acid Level (wt %) | Sample Location In Container | Shaken (YES/NO) | RV |
|---|---|---|---|---|---|
| 5 (a) | Ground Nylon Plop | — | As Is sample | | 83.72 |
| 5 (b) | [Control] | | Top | Y | 84.95 |
| 5 (c) | | — | Bottom | Y | 77.24 |
| 5 (d) | Ground Nylon Plop | 0.3 | Well-mixed | N | 65.68 |

TABLE 6-continued

| Example # | Sample Description | Adipic Acid Level (wt %) | Sample Location In Container | Shaken (YES/NO) | RV |
|---|---|---|---|---|---|
| 5 (e) | Ground Nylon Plop | 0.3 | Well-mixed | N | 53.89 |
| 5 (f) | Ground Nylon Plop | 0.3 | Top | Y | 55.53 |
| 5 (g) | Ground Nylon Plop | 0.3 | Top | Y | 46.29 |
| 5 (h) | Ground Nylon Plop | 0.3 | Bottom | Y | 60.35 |
| 5 (i) | Ground Nylon Plop | 0.3 | Bottom | Y | 61.15 |

From the measured RV data in Table 5, no significant difference was observed in RV between the mixed-and-unshaken samples (see, 5(d), 5(e)) as compared to the mixed-and-shaken samples (see, 5(f) through 5(i)). Further, in the case of shaken samples, the RV did not appear to decrease going from top (see, 5(f), 5(g)) to bottom (see, 5(h), 5(i)) sampling locations for the container having a dry mixture of adipic acid and granulated nylon plop.

Based on this result, a dry mixed blend of solid adipic acid and granulated nylon plop is an effective vehicle for transporting these materials. The results of Table 5 show that settling of adipic acid in a dry mixture of granulated nylon does not need to be viewed as a concern. Additionally, a dry mixture of adipic acid and ground nylon plop proves stable for distribution.

The robustness and stability of the mixture was surprising and unexpected technical effect. As later shown in Example 7, the regrind nylon material having greater than 97% (by weight) of particles above 300 microns mixed and performed effectively well with the acid material having greater than 94% (by weight) of particles less than 710 microns. It would have been expected that significant solids classification would occur between the coarser regrind material and finer acid material with the resulting mixture of varying composition, and thus, inconsistent RV effect. However, that was not observed in the present example.

Example 6

In this example, an in-line rheometer and control system is installed within any variation of the extruder equipment variations described above. The rheometer is similar in design to a Dynisco Extruder Mounted ZDR configuration—a slight die allows for fitting to the flow passage block and pump within the rheometer. This allows for testing shear rates in the range of 150-300 s−1 which ultimately allows for melt viscosity measurements to be used in place of RV as a control variable on the process.

Measuring RV directly would lead to significant lag time between the time for dissolution and eventual measurement of the sample while production remains underway. Instead, in this example we use viscosity from an in-line rheometer as a proxy for measurement of RV by the logic outlined below.

It is well-established that the melt viscosity y of linear polymers is related by a power law to the weight-averaged molar mass Mw according to Equation [1] below:

$$\mu = K M_W^\alpha \qquad \text{Equation [1]}$$

In Equation [1] K is a material constant and the power a is between 3.4 and 3.5. While it is also understood that p varies with temperature and the percent composition of additives, such as TiO2, we assume that the variations in these properties are small within the course of a production run, such that measurement of p essentially acts as a measure of RV.

Without being limited to theory, it can be imagined that the equilibrium between hydrolysis and amidation is brought off-balance with the addition of adipic acid in the melt phase. The imbalance of carboxyl and amine ends, $\Delta=[COOH]-[NH_2]$, along with the product of these ends, $PE=[COOH][NH_2]$ determines a new equilibrium weight-averaged molecular weight, as given in Equation 121:

$$M_W = \frac{4*10^6}{(\Delta^2 + 4PE)^{1/2} + U} \qquad \text{[Equation 2]}$$

In Equation [2] U is the concentration of unreactive ends. Again, without being limited to theory it can be imagined that RV is related to the sum of the amine and carboxyl ends, $SE=[COOH]+[NH_2]$, by an additional power law, as given in Equation [3];

$$RV = \frac{12310}{(SE - 38.3)^{1.27}} + 2.13 \qquad \text{[Equation 3]}$$

In this way, controlling the feed rate of any of an adipic acid-enriched nylon feed stream (See, e.g., FIG. 2), the feed rate of an adipic acid feed stream alone (See, e.g., FIG. 1), and the feed rate of a nylon feed stream alone (See, e.g., FIG. 1), can determine the weight-averaged molecular weight in Equation [2], measured as a melt viscosity in Equation [1] which can also be related as an RV via Equation [3].

In this way, controlling the feed rate of adipic acid-enriched ground plop determines the weight-averaged molecular weight in Equation [2], measured as a melt viscosity in Equation [1] which can also be related as an RV via Equation 131.

Example 7

Tables 7 and 8 below represent the measured particle size distributions for acid and regrind materials according to the present disclosure.

Three representative samples for each, regrind material and adipic acid, were analyzed for particle size distribution using a sieve-screen shaker as described in Analytical Methods section above. The three regrind material test samples are labeled as Regrind 1, Regrind 2 and Regrind 3. The three acid material test samples are labeled as AA 1, AA 2 and AA 3. These samples represented the materials used in Example 8 runs (for the 'Regular Regrind' and 'AA-Regrind' campaigns).

The regrind material comprised of irregular random particle shapes with less than 3% (by weight) of the sampled particles ≤300 microns size, of which, less than 1% (by weight) of the sampled particles were ≤106 microns size. Greater than 97% (by weight) of the sampled Regrind material particles were above 300 microns size.

The acid material comprised of a unimodal particle size distribution with ≤6% (by weight) of the sampled particles ≥710 microns size. Greater than about 94% (by weight) of the sampled adipic acid material particles measured less than 710 microns size.

It was, therefore, surprising and unexpected to observe that the Regrind material having greater than 97% (by weight) of particles above 300 microns mixed and performed effectively well with the acid material having greater than 94% (by weight) of particles less than 710 microns.

TABLE 7

Weight % Distribution

| Sieve Size (microns) | Regrind 1 | Regrind 2 | Regrind 3 | AA1 | AA 2 | AA 3 |
|---|---|---|---|---|---|---|
| 2000 | 59.7 | 64.1 | 44.3 | 0 | 0 | 0 |
| 1000 | 28.7 | 25.7 | 38.2 | 0.6 | 0.5 | 0.5 |
| 710 | 6.7 | 5.6 | 11.4 | 5.4 | 4.5 | 4.3 |
| 500 | 2.6 | 2.3 | 3.5 | 21 | 16.3 | 15.2 |
| 300 | 1.6 | 1.4 | 2 | 50.1 | 47 | 46.7 |
| 106 | 0.7 | 0.8 | 0.5 | 22.2 | 31 | 33 |
| 0 | 0.1 | 0 | 0.1 | 0.6 | 0.7 | 0.4 |

TABLE 8

Cumulative Weight % Distribution

| Sieve Size (microns) | Regrind 1 | Regrind 2 | Regrind 3 | AA 1 | AA 2 | AA 3 |
|---|---|---|---|---|---|---|
| 1000 | 40.4 | 35.8 | 55.7 | 99.9 | 100 | 100.1 |
| 710 | 11.7 | 10.1 | 17.5 | 99.3 | 99.5 | 99.6 |
| 500 | 5 | 4.5 | 6.1 | 93.9 | 95 | 95.3 |
| 300 | 2.4 | 2.2 | 2.6 | 72.9 | 78.7 | 80.1 |
| 106 | 0.8 | 0.8 | 0.6 | 22.8 | 31.7 | 33.4 |
| 0 | 0.1 | 0 | 0.1 | 0.6 | 0.7 | 0.4 |

Example 8

A commercial-scale trial according to the present disclosure was run on a single-screw extruder (6" screw diameter, ~30 L/D), at a throughput of roughly 1800-2000 lbs/hr. The regrind and adipic acid materials used in these runs are represented in Example 7 and Tables 7 and 8 above. The content of adipic acid in regrind was maintained at 0.3 wt. % for the "AA-Regrind" noted in Table 9 below. Adipic acid-regrind blend was prepared using an industrial-scale ribbon blender, approximately 1,100-lb batches of combined adipic acid and regrind, labeled herein as "AA-Regrind". The blend was then boxed and transported to a re-melting facility, where the adipic acid-regrind blend was combined with fiber material and melt extruded into pellets (25% AA-Regrind in Table 9).

Figure 6:
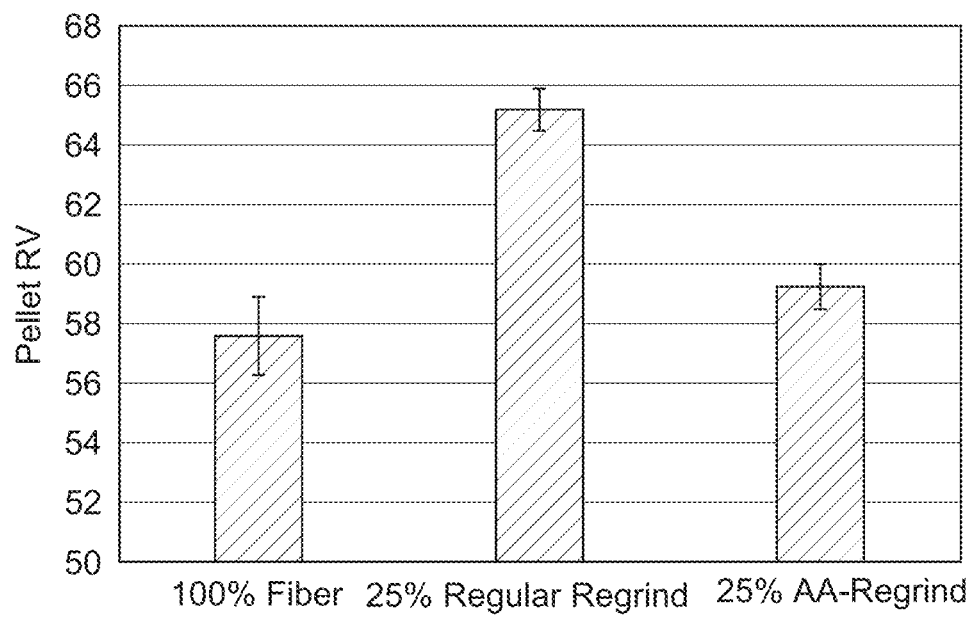
FIG. 6 is a representation of the measured RV values for Example 8 embodiments and according to the present disclosure.

FIG. 6 represents the measured RV values for three specimens prepared in this example. The "100% Fiber" sample was developed using only post-industrial fiber waste and no regrind; the "25% Regular Regrind" sample included 75% of the same source post-industrial fiber waste and 25% Regrind containing no adipic acid; and, the "25% AA-Regrind" sample included the same source post-industrial fiber waste, along with 25% of the blended adipic acid-regrind batches developed via ribbon blending (described above).

TABLE 9

| Component | 100% Fiber | 25% Regular Regrind | 25% AA-Regrind |
|---|---|---|---|
| Recycled Nylon Plop/Regrind wt % Content | 0 | 25 | 25 |
| Adipic Acid (wt. %) Mixed in Recycled Plop | N/A | 0 | 0.3 |
| Adipic Acid in final product, (wt. %) | 0 | 0 | 0.075 |
| Average RV (formic acid method) | 57.6 | 65.2 | 59.3 |
| RV Variability Span Range (from 20 trials) | 10-point [54-64] | 5-point [63 68] | 4-point [57-61] |

No processing issues were observed when the production was switched from the 25% Regular Regrind to the 25% AA-Regrind campaign. Although not incorporated with this trial, slight adjustments to adipic acid level in regrind are possible to fine-tune to a target RV, such as increasing from 0.3 wt. % to 0.35 wt. % or to 0.4 wt. % or to 0.45 wt. %.

Figure 7:
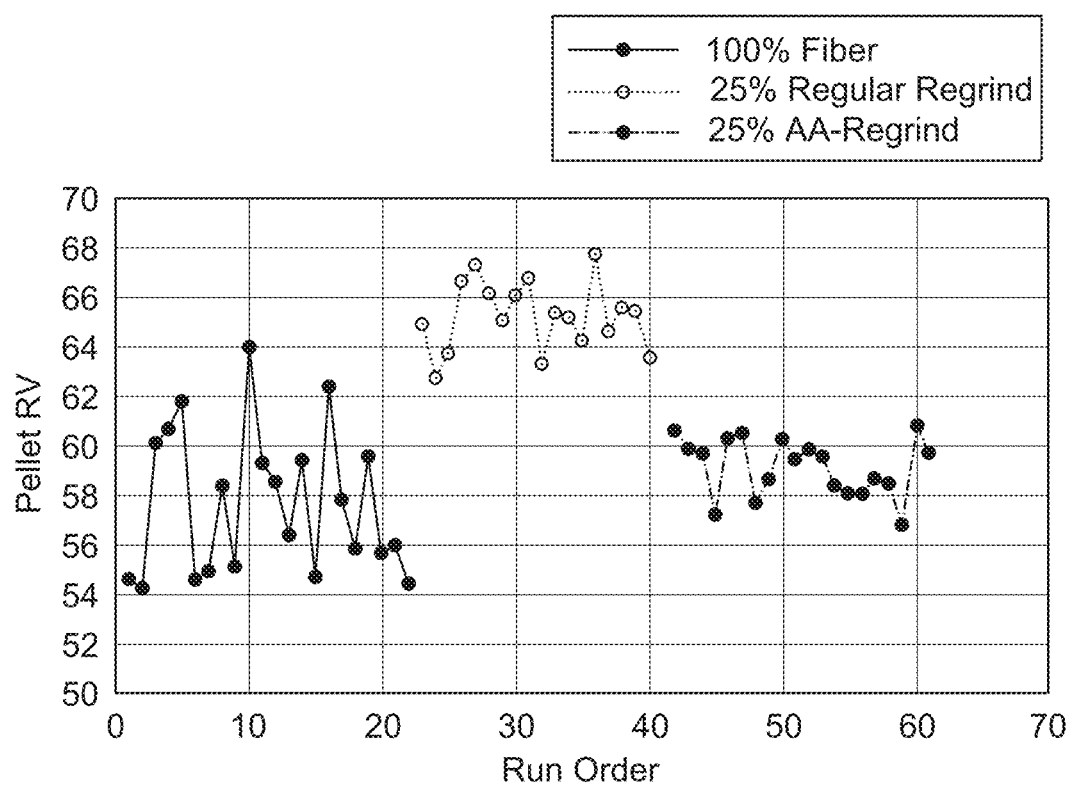
FIG. 7 is a representation of the RV variability for Example 8 embodiments and according to the present disclosure.

FIG. 7 shows an unexpected result of a reduced variability in Pellet RV that was observed with the addition of regrind material, further containing adipic acid. In each case, Pellet RV variability was determined from twenty trials. The Pellet RV variability span was in the 10-point range for "100% Fiber" samples. For regrind containing materials including both "25% Regular Regrind" and "25% AA-Regrind", the RV variability span was measured in the 4- to 5-point range. The RV variability spread was tighter for the regrind-containing materials compared to the "100% Fiber" materials. A lower campaign-to-campaign variability is always desired and beneficial from a commercial perspective and in providing consistent product specification and quality.

Figure 8:
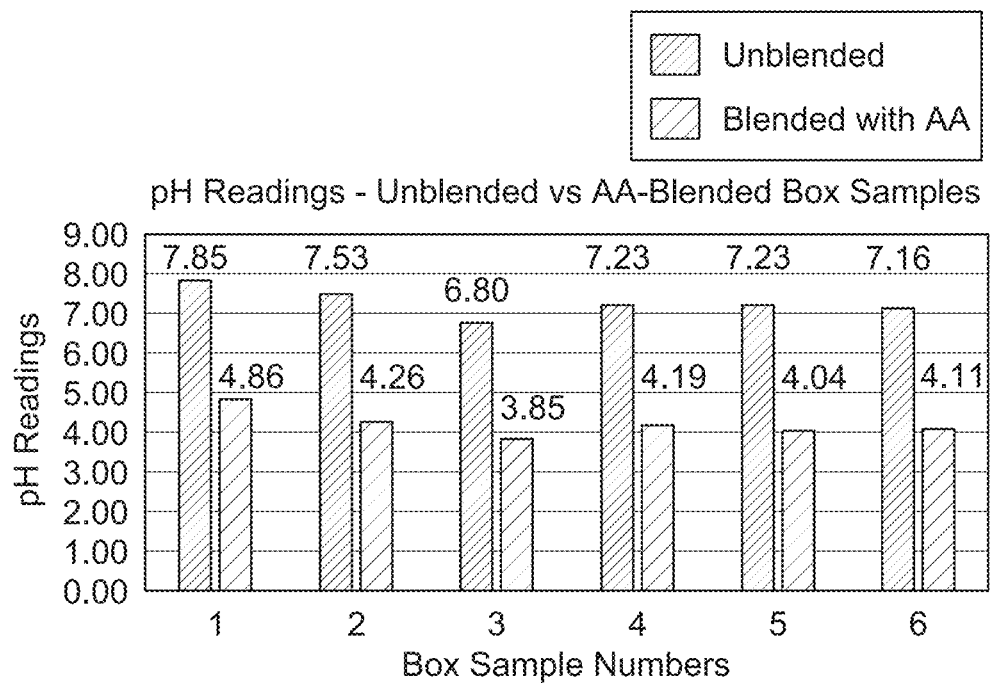
FIG. 8 is a representation for Example 8 embodiments and according to the present disclosure.
Figure 9:
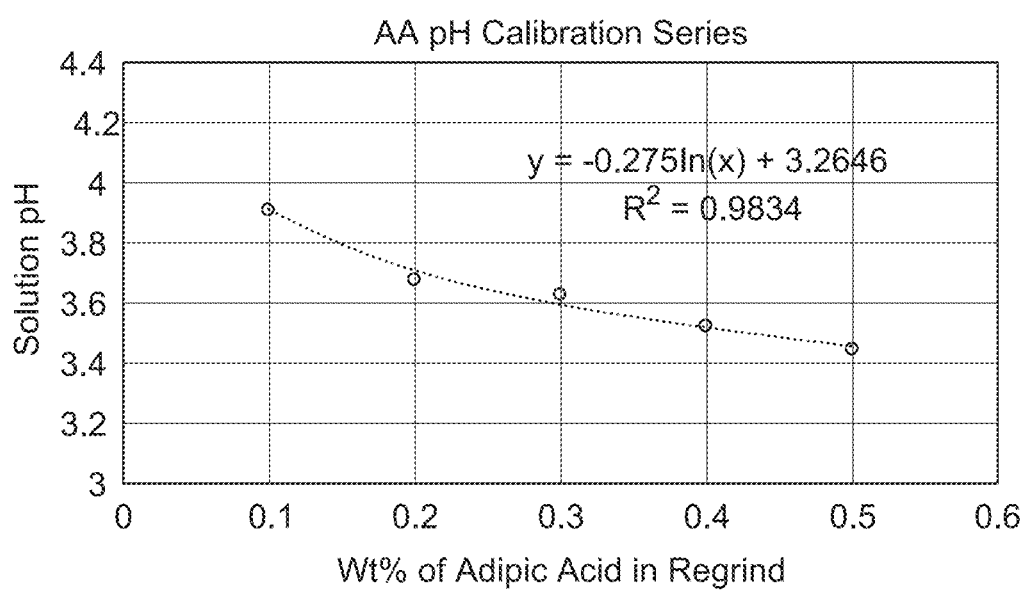
FIG. 9 represents a calibration curve to determine the acid level in the sample according to the embodiments of this disclosure.

The robustness of acid level determination from Solution pH measurement method is shown in FIG. 8. Several samples of the unblended (no acid content) and acid-blended materials were analyzed using the pH method. Batches with and without acid content were clearly distinguishable by the pH method.

Example 9

For the commercial samples of Example 8, pH measurements were performed for six of the adipic acid-regrind blend samples, and before and after shipments. About 30 g of sample was put in about 205 mL water and the pH of resulting solution was measured for each sample after stirring for approximately 5 minutes.

In Table 10 below, the pH data is shown side-by-side for each of the six box samples before and after shipment between the production sites. The 'Before Shipment' description refers to sampling taken immediately after the adipic acid-regrind blends were boxed out from the ribbon blending operation (described in Example 8). The 'After Shipment' description refers to sampling from the same boxes at the re-melting facility immediately prior to introduction of this material to the '25% AA-Regrind' campaign in Example 8.

TABLE 10

| Sample ID | pH Data (Before Shipment) | pH Data (After Shipment) |
|---|---|---|
| 10a | 4.86 | 3.91 |
| 10b | 4.26 | 3.79 |
| 10c | 3.85 | 3.77 |
| 10d | 4.19 | 3.82 |
| 10e | 4.04 | 3.77 |
| 10f | 4.11 | 3.87 |
| Averaged | 4.22 | 3.82 |

Very little change in pH measurement after shipment of the six tested samples was observed. This is an indication of the stability of AA-Regrind blends according to the present disclosure. Also, there was no evidence of acid settling to bottom of shipment containers.

Exemplary Embodiments

The following exemplary aspects are provided, the numbering of which is not to be construed as designating levels of importance:

Embodiment 1 provides a method of reducing the relative viscosity (RV) of a polyamide, comprising:
treating a poly amide having a RV of 45 or greater with an additive comprising an organic dicarboxylic acid dry-blended with a second polyamide, wherein greater than 50 wt % of the additive is the second polyamide; and
melting the treated polyamide. Embodiment 1 may further include a method of reducing the relative viscosity (RV) of a polyamide, comprising:
treating a polyamide having a RV of 45 or greater with an additive comprising an organic dicarboxylic acid, having a particle size distribution with >94% by weight of the particles scaling <710 microns, dry-blended with a second polyamide, with a particle size distribution such that >97 wt % of particles >300 microns and ≤3 wt % of particles ≤300 microns, wherein greater than 50 wt % of the additive is the second polyamide; and melting the treated polyamide.

Embodiment 2 provides the method of Embodiment 1, wherein 0.01 wt % to 1.0 wt % of the treated polyamide is the organic dicarboxylic acid.

Embodiment 3 provides the method of Embodiment 1 or 2, wherein 0.05 wt % to 0.5 wt % of the treated polyamide is the organic dicarboxylic acid.

Embodiment 4 provides the method of any one of Embodiments 1-3, wherein 0.1 wt % to 0.2 wt % of the treated polyamide is the organic dicarboxylic acid.

Embodiment 5 provides the method of any one of Embodiments 1-4, wherein the organic dicarboxylic acid is a linear dicarboxylic acid having the formula $HO_2C—(CH_2)_n-CO_2H$, wherein n is an integer from 0 to 12.

Embodiment 6 provides the method of any one of Embodiments 1-5, wherein the polyamide contains a diamine monomer and a dicarboxylic acid monomer, and the dicarboxylic acid monomer is the same as the organic dicarboxylic acid.

Embodiment 7 provides the method of any one of Embodiments 1-6, wherein the organic dicarboxylic acid is adipic acid.

Embodiment 8 provides the method of any one of Embodiments 1-7, wherein the polyamide is nylon-6,6.

Embodiment 9 provides the method of any one of Embodiments 1-8, wherein the polyamide is a mixture of one or more of nylon waste fibers, nylon pellets, nylon plop, post-consumer nylon, post-industrial nylon, commercially acceptable nylon, nylon having an RV of from ≥22 to ≤36, nylon having an RV of from >36 to ≤50, nylon having an RV of from >50 to ≤70, and nylon having an RV of from >70 to ≤140.

Embodiment 10 provides the method of any one of Embodiments 1-9, wherein the polyamide has an RV of 60 or greater.

Embodiment 11 provides the method of any one of Embodiments 1-10, wherein the polyamide has an RV of 75 or greater.

Embodiment 12 provides the method of any one of Embodiments 1-11, wherein the polyamide is a mixture of one or more polyamide components, wherein at least one polyamide component has an RV of 60 or greater and is greater or equal to 30 wt % of the polyamide mixture.

Embodiment 13 provides the method of any one of Embodiments 1-12, wherein the polyamide is a mixture of one or more polyamide components, wherein at least one polyamide component has an RV of 75 or greater and is greater or equal to 30 wt % of the polyamide mixture.

Embodiment 14 provides the method of any one of Embodiments 1-13, wherein the polyamide is a mixture of one or more polyamide components, wherein at least one polyamide component has an RV of 60 or greater and is greater or equal to 50 wt % of the polyamide mixture.

Embodiment 15 provides the method of any one of Embodiments 1-14, wherein the polyamide is a mixture of one or more polyamide components, wherein at least one polyamide component has an RV of 75 or greater and is greater or equal to 50 wt % of the polyamide mixture.

Embodiment 16 provides the method of any one of Embodiments 1-15, wherein the polyamide is a mixture of one or more polyamide components, wherein at least one polyamide component has an RV of 60 or greater and is greater or equal to 75 wt % of the polyamide mixture.

Embodiment 17 provides the method of any one of Embodiments 1-16, wherein the polyamide is a mixture of one or more polyamide components, wherein at least one polyamide component has an RV of 75 or greater and is greater or equal to 75 wt % of the polyamide mixture.

Embodiment 18 provides the method of any one of Embodiments 1-17, wherein at least 20 wt % of the polyamide is granulated nylon plop.

Embodiment 19 provides the method of any one of Embodiments 1-18, wherein at least 30 wt % of the polyamide is granulated nylon plop.

Embodiment 20 provides the method of any one of Embodiments 1-19, wherein at least 60 wt % of the polyamide is granulated nylon plop.

Embodiment 21 provides the method of any one of Embodiments 1-20, wherein the polyamide is solid and in the form of pellets, granulate, powder, flakes, chips, or a mixture thereof.

Embodiment 22 provides the method of any one of Embodiments 1-21, wherein the organic dicarboxylic acid is solid and in the form of pellets, granulate, powder, flakes, chips, or a mixture thereof.

Embodiment 23 provides the method of any one of Embodiments 1-22, further comprising grinding the polyamide prior to treating it with the organic dicarboxylic acid and melting it.

Embodiment 24 provides the method of any one of Embodiments 1-23, wherein the second polyamide is a polyamide having a RV of 45 or greater.

Embodiment 25 provides the method of any one of Embodiments 1-24, wherein the second polyamide is a polyamide having a RV of 60 or greater.

Embodiment 26 provides the method of any one of Embodiments 1-25, wherein the second polyamide is a polyamide having a RV of 75 or greater.

Embodiment 27 provides the method of any one of Embodiments 1-26, wherein the second polyamide is plop.

Embodiment 28 provides the method of any one of Embodiments 1-27, wherein 75 wt % or more of the additive is the second polyamide.

Embodiment 29 provides the method of any one of Embodiments 1-28, wherein 90 wt % or more of the additive is the second polyamide.

Embodiment 30 provides the method of any one of Embodiments 1-29, wherein the 95% or more of the additive is the second polyamide.

Embodiment 31 provides the method of any one of Embodiments 1-30, wherein the additive consists essentially of the organic dicarboxylic acid and the second polyamide.

Embodiment 32 provides the method of any one of Embodiments 1-31, wherein the second polyamide is nylon-6,6.

Embodiment 33 provides the method of any one of Embodiments 1-32, wherein the polyamide and the organic dicarboxylic acid are provided to an extruder via one or more feed stream.

Embodiment 34 provides the method of any one of Embodiments 1-33, wherein melting the polyamide comprises subjecting it to a temperature 1-50° C. above the melting point of the polyamide.

Embodiment 35 provides the method of any one of Embodiments 1-34, wherein the polyamide has a moisture content of less than 0.2%.

Embodiment 36 provides the method of any one of Embodiments 1-35, wherein the polyamide has a moisture content of less than 0.05%.

Embodiment 37 provides the method of any one of Embodiments 1-36, wherein addition of at least one of the polyamide and the organic dicarboxylic acid to an extruder is managed by a feedback control system which measures the viscosity of melted polyamide in the extruder and adjusts the addition rate to result in product having a desired viscosity.

Embodiment 38 provides the method of Embodiment 37, wherein the control system increases addition of the polyamide to decrease the viscosity to a desired viscosity.

Embodiment 39 provides the method of Embodiment 37 or 38, wherein the control system decreases addition of the polyamide to increase the viscosity to a desired viscosity.

Embodiment 40 provides the method of any one of Embodiments 1-39, wherein the treating of the polyamide and the organic dicarboxylic acid is managed by a feedback control system which measures the viscosity of the melted polyamide and adjusts the amount of the organic dicarboxylic acid dry mixed with the polyamide to result in product having a desired viscosity.

Embodiment 41 provides a system for recycling waste nylon, comprising:
at least one feed stream providing an organic dicarboxylic acid alone or as a dry blended with a polyamide;
at least one feed stream providing the same or different polyamide with at least one feed stream providing waste nylon;
an extruder which accepts the one or more feed streams, conveys the collected feed to a melting zone which melts the feed into a polymer melt, which is extruded;
a control system;
one or more flow control devices which control the feed rate of the one or more feed stream, and
a rheometer configured to measure the melt viscosity of the polymer melt and provide a feedback signal to the control system;
wherein the control system adjusts one or more flow control device based on the melt viscosity measured by the rheometer.

Embodiment 42 provides the system of Embodiment 41, where the system is a continuous system and the control system adjusts one or more feed streams in real-time based on the measured melt viscosity Embodiment 43 provides the system of Embodiment 41 or 42, comprising a flow control device which controls the feed rate of the feed stream providing the organic dicarboxylic acid.

Embodiment 44 provides the system of any one of Embodiments 41-43, comprising a flow control device which controls the feed rate of the feed stream providing the waste nylon.

Embodiment 45 provides the system of any one of Embodiments 41-44, wherein the system further comprising a pre-mixer which collects and premixes two or more feed streams to generate a mixed feed stream.

Embodiment 46 provides the system of Embodiment 45, comprising a flow control device which controls the feed rate of the mixed feed stream.

Embodiment 47 provides the system of any one of Embodiments 41-46, wherein the rheometer measures a melt viscosity higher than a predetermined value and the control system increases the feed rate of the organic dicarboxylic acid additive, decreases the feed rate of the waste nylon, or both.

Embodiment 48 provides the system of any one of Embodiments 41-47, wherein the rheometer measures a melt viscosity lower than a predetermined value and the control system decreases the feed rate of the organic dicarboxylic acid additive, increases the feed rate of the waste nylon, or both.

Embodiment 49 provides a method of reducing the relative viscosity (RV) of recycled plop, comprising:
granulating nylon plop;
treating the granulated plop with an organic dicarboxylic acid in an amount that is 0.01 wt % to 1.0 wt % of the treated plop; and
melting the treated plop.

Embodiment 50 provides the method of Embodiment 49, wherein the granulated plop has an RV greater than 60.

Embodiment 51 provides the method of Embodiment 49 or 50, wherein the granulated plop has an RV greater than 75.

Embodiment 52 provides the method of any one of Embodiments 49-51, wherein treating comprises dry-mixing the nylon plop and the organic dicarboxylic acid together.

Embodiment 53 provides the method of any one of Embodiments 49-52, wherein the polyamide and the organic dicarboxylic acid is fed directly to an extruder, mixed and melted therein.

Embodiment 54 provides a stable composition comprising a solid polyamide having an RV of 45 or greater and a solid organic dicarboxylic acid, wherein 0.01 wt % to 5.0 wt % of the composition is the organic dicarboxylic acid and greater than 50 wt % of the composition is the polyamide.

Embodiment 55 provides the stable composition of Embodiment 54, wherein 0.01 wt % to 1.0 wt % of the composition is the organic dicarboxylic acid.

Embodiment 56 provides the stable composition of Embodiment 54 or 55, wherein the polyamide and the organic dicarboxylic acid are dry mixed.

Embodiment 57 provides the stable composition of Embodiment 54 or 55, wherein the polyamide has an RV of 60 or greater.

Embodiment 58 provides the stable composition of any one of Embodiments 54-56, wherein the polyamide has an RV of 75 or greater.

Embodiment 59 provides the stable composition of any one of Embodiments 54-57, wherein 75 wt % or more of the composition is the polyamide.

Embodiment 60 provides the stable composition of any one of Embodiments 54-59, wherein 95 wt % or more of the composition is the polyamide.

Embodiment 61 provides the stable composition of any one of Embodiments 54-60, consisting essentially of the polyamide and the organic dicarboxylic acid dry mixed.

Embodiment 62 provides the stable composition of any one of Embodiments 54-61, wherein the polyamide is in the form of pellets, granulate, powder, flakes, chips, or a mixture thereof.

Embodiment 63 provides the stable composition of any one of Embodiments 54-62, wherein the organic dicarboxylic acid is in the form of pellets, granulate, powder, flakes, chips, or a mixture thereof.

Embodiment 64 provides the stable composition of any one of Embodiments 54-63, wherein the poly amide contains a diamine monomer and a dicarboxylic acid monomer, and the dicarboxylic acid monomer is the same as the organic dicarboxylic acid.

Embodiment 65 provides the stable composition of any one of Embodiments 54-64, wherein the polyamide is granulated nylon plop.

Embodiment 66 provides the method of Embodiment 1, wherein the RV of the treated polyamide varies less over time than a control that is not treated with the additive.

Embodiment 67 provides the method of Embodiment 1, where variability span in the RV value of the treated polyamide is from ≥0.01% to ≤50% of a control that is not treated with the additive.

Embodiment 68 provides the method of Embodiment 67, wherein the RV variability span is determined from twenty runs operated at equivalent conditions.

Embodiment 69 provides the method of Embodiment 66, wherein the RV varies less than five (5) RV numbers than the control over the same time period.

Embodiment 70 provides the method of Embodiment 1, wherein ≥0.001% to ≤1% wt. of the sampled particles have a major dimension of ≤106 microns in size.

What is claimed is:

1. A method of reducing the relative viscosity (RV) of a polyamide melt, the method comprising:
    treating a first polyamide having a RV of 45 or greater with an additive mixture comprising an organic dicarboxylic acid and a second polyamide, wherein the particle size distribution of the organic dicarboxylic acid component is characterized by >94% by weight of particles scaling <710 microns, dry-blended with a second polyamide, where the second polyamide is characterized by >97 wt % of particles scaling >300 microns and ≤3 wt % of particles scaling <300 microns, and wherein greater than 50 wt % of the additive mixture is the second polyamide; and
    melting the first polyamide treated with the additive mixture.

2. The method of claim 1, wherein 0.01 wt % to 1.0 wt % of a combination of the first polyamide and the additive mixture is the organic dicarboxylic acid.

3. The method of claim 1, wherein 0.05 wt % to 0.5 wt % of a combination of the first polyamide and the additive mixture is the organic dicarboxylic acid.

4. The method of claim 1, wherein 0.1 wt % to 0.5 wt % of a combination of the first polyamide and the additive mixture is the organic dicarboxylic acid.

5. The method of claim 1, wherein the organic dicarboxylic acid is a linear dicarboxylic acid having a formula $HO_2C-(CH_2)_n-CO_2H$, wherein n is an integer from 0 to 12.

6. The method of claim 1, wherein the polyamide is derived from a diamine monomer and a dicarboxylic acid monomer, and the dicarboxylic acid monomer is the same as the organic dicarboxylic acid.

7. The method of claim 1, wherein the organic dicarboxylic acid is adipic acid.

8. The method of claim 1, wherein the first polyamide is nylon-6,6.

9. The method of claim 1, wherein either the first or the second polyamide is a mixture of one or more of nylon waste fibers, nylon pellets, nylon plop, post-consumer nylon, post-industrial nylon, nylon having an RV of from ≥50 to ≤70, and nylon having an RV of from ≥70 to ≤140.

10. The method of claim 1, wherein either the first or the second polyamide has an RV of 60 or greater.

11. The method of claim 1, wherein either the first or the second polyamide has an RV of 75 or greater.

12. The method of claim 1, wherein either the first or the second polyamide is a mixture of one or more polyamide components, wherein at least one polyamide component has an RV of 60 or greater and is greater or equal to 30 wt % of the polyamide mixture.

13. The method of claim 1, wherein either the first or the second polyamide is a mixture of one or more polyamide components, wherein at least one polyamide component has an RV of 75 or greater and is greater or equal to 30 wt % of the polyamide mixture.

14. The method of claim 1, wherein either the first or the second polyamide is a mixture of one or more polyamide components, wherein at least one polyamide component has an RV of 60 or greater and is greater or equal to 50 wt % of the polyamide mixture.

15. The method of claim 1, wherein either the first or the second polyamide is a mixture of one or more polyamide components, wherein at least one polyamide component has an RV of 75 or greater and is greater or equal to 50 wt % of the polyamide mixture.

16. The method of claim 1, wherein either the first or the second polyamide is a mixture of one or more polyamide components, wherein at least one polyamide component has an RV of 60 or greater and is greater or equal to 75 wt % of the polyamide mixture.

17. The method of claim 1, wherein either the first or the second polyamide is a mixture of one or more polyamide components, wherein at least one polyamide component has an RV of 75 or greater and is greater or equal to 75 wt % of the polyamide mixture.

18. The method of claim 1, wherein at least 20 wt % of either the first or the second polyamide is granulated nylon plop.

19. The method of claim 1, wherein ≤1% wt. of particles of the second polyamide have a major dimension of ≤106 microns in size.

20. The method of claim 1, further comprising forming pellets from the melted first polyamide treated with the additive mixture, wherein over multiple performances of the method a maximum variation in RV of the pellets is less than a maximum variation in RV of control pellets formed from melting of the first polyamide that is not treated with the additive mixture.

21. The method of claim 20, where the maximum variation in the RV value of the pellets is from ≥0.01% to ≤50% of the maximum variation in RV of the control pellets.

22. The method of claim 20, wherein the multiple performances of the method are twenty performances of the method.

23. The method of claim 20, wherein the maximum variation in RV of the pellets is at least 5 less than the maximum variation in RV of the control pellets.

* * * * *